(12) United States Patent
Geohegan et al.

(10) Patent No.: US 7,815,973 B2
(45) Date of Patent: Oct. 19, 2010

(54) CONDENSED PHASE CONVERSION AND GROWTH OF NANORODS AND OTHER MATERIALS INSTEAD OF FROM VAPOR

(75) Inventors: David B. Geohegan, Knoxville, TN (US); Roland D. Seals, Oak Ridge, TN (US); Alex A. Puretzky, Knoxville, TN (US); Xudong Fan, Oak Ridge, TN (US)

(73) Assignees: UT-Battelle, LLC, Oak Ridge, TN (US); University of Tennessee Research Foundation, Knoxville, TN (US)

( * ) Notice: Subject to any disclaimer, the term of this patent is extended or adjusted under 35 U.S.C. 154(b) by 953 days.

(21) Appl. No.: 11/037,725

(22) Filed: Jan. 18, 2005

(65) Prior Publication Data
US 2005/0164583 A1 Jul. 28, 2005

Related U.S. Application Data

(60) Continuation of application No. 09/997,600, filed on Nov. 28, 2001, now Pat. No. 6,923,946, which is a division of application No. 09/449,844, filed on Nov. 26, 1999, now abandoned.

(51) Int. Cl.
 *B05D 3/02* (2006.01)
(52) U.S. Cl. .............. 427/372.2; 977/842; 977/844; 423/447.1
(58) Field of Classification Search .............. 423/447.1; 977/842, 844; 427/372.2
See application file for complete search history.

(56) References Cited

U.S. PATENT DOCUMENTS 6,277,318 B1 * 8/2001 Bower et al. ............... 264/346
6,303,094 B1 * 10/2001 Kusunoki et al. ......... 423/447.1
6,333,016 B1 12/2001 Resasco et al.
6,630,772 B1 * 10/2003 Bower et al. ............... 313/311

FOREIGN PATENT DOCUMENTS

WO   WO 98/39250   9/1998

OTHER PUBLICATIONS

Iijima, Sumio et al. "Single-shell carbon nanotubes of 1-nm diameter", Nature, vol. 363, p. 603. Jun. 1993.*
Thess et al., "Crystalline ropes of metallic carbon nanotubes," Science, 1996, vol. 273, pp. 483-487.*
Thess et al., "Crystalline ropes of metallic carbon nanotubes," Jul. 26, 1996, Science, vol. 273, pp. 483-488.
Gogotsi, et al., "Graphite Polyhedral Crystals" from www.sciencemag.org, vol. 290, pp. 317-320, Oct. 13, 2000.

(Continued)

*Primary Examiner*—Michael Cleveland
*Assistant Examiner*—Robert Vetere
(74) *Attorney, Agent, or Firm*—Brinks Hofer Gilson & Lione

(57) ABSTRACT

Compositions, systems and methods are described for condensed phase conversion and growth of nanorods and other materials. A method includes providing a condensed phase matrix material; and activating the condensed phase matrix material to produce a plurality of nanorods by condensed phase conversion and growth from the condensed phase matrix material instead of from vapor. The compositions are very strong. The compositions and methods provide advantages because they allow (1) formation rates of nanostructures necessary for reasonable production rates, and (2) the near net shaped production of component structures.

40 Claims, 19 Drawing Sheets

OTHER PUBLICATIONS

Biro, et al. "Growth of Carbon Nanotubes by Fullerene Decomposition in the Presence of Transition Metals", Chemical Physics Letters, pp. 155-162, Jun. 11, 1999.

O'Loughlin, et al., "Rapid Synthesis of Carbon Nanotubes by Solid-State Metathesis Reactions", Journal of Physical Chemistry, vol. 105, pp. 1921-1924, Jan. 25, 2001.

Sen, et al., "Growth of Single-Walled Carbon Nanotubes From the Condensed Phase", Chemical Physics Letters, vol. 349, pp. 383-388, Dec. 7, 2001.

Schlittler et al., et al. "Single Crystals of Single-Walled Carbon Nanotubes Formed by Self-Assembly" vol. 292, pp. 1136-1139, May 11, 2001.

Czerwosz et al., "From fullerenes to carbon nanotubes by Ni catalysis" Diamond and Related Materials from www.elsevier.com, vol. 9, pp. 901-905, 2000.

Czerwosz et al., "Atomic force microscopy and transmission electron microscopy investigations of catalytic formed nanotubes in $C_{60}/C_{70}$ + Ni Layers", Applied Surface Science from www.elsevier.com, vol. 141, pp. 350-356, 1999.

Terranova et al., "Structural investigations of single-wall carbon nanotubes grown from nanosized graphite", Materials Chemistry and Physics from www.elsevier.com, vol. 66, pp. 270-273, 2000.

Grobert et al., "Thermolysis of $C_{60}$ thin films yields Ni-filled tapered nanotubes", Applied Physics A Materials Science & Processing, vol. 67, pp. 595-598, 1998.

Wong et al., "Carbon nanotube growth by rapid thermal processing" Diamond and Related Materials from www.elsevier.com, vol. 10, pp. 1810-1813, 2001.

Czerwosz et al., "Photoluminescence and Raman investigations of structural transformation of fullerenes into carbon nanotubes in vacuum annealed $C_{60}/C_{70}$ + Ni films" Journal of Physics and Chemistry of Solids from www.elsevier.com, vol. 61, pp. 1973-1978, 2000.

Ehlich et al., "Growth of nanotubes by decomposition of $C_{60}$ on transition metal surfaces", Synthetic Metals from www.elsevier.com, vol. 103, pp. 2486-2487, 1999.

Guillom, et al., "Operation of a gated field emitter using an individual carbon nanofiber cathode," Applied Physics Letters, vol. 79, No. 21, pp. 3506-3508, Nov. 19, 2001.

Baylor, et al., "Field emission from isolated individual vertically aligned carbon nanocones" Journal of Applied Physics, vol. 91, No. 7, pp. 4602-4606, Apr. 1, 2002.

Saito et al., "Field Emission Patterns from Single-Walled Carbon Nanotubes," Japan Journal Applied Physics, vol. 36, pp. 1340-1342, Oct. 1, 1997.

Matsumoto, et al., "Ultralow biased field emitter using single-wall carbon nanotube directly grown onto silicon tip by thermal chemical vapor deposition," Applied Physics Letters, vol. 78, No. 4, pp. 539-540, Jan. 22, 2001.

Guillom, et al., "Fabrication of gated cathode structures using an in situ grown vertically aligned carbon nanofiber as a field emission element", Journal of Vacuum Science, pp. 573-578, Mar./Apr. 2001.

Rinzler, et al., "Unraveling Nanotubes: Field Emission from an Atomic Wire" available at wwww.jstor.org, pp. 1550-1553, May 9, 2002.

Merkulov, et al., "Patterned growth of individual and multiple vertically aligned carbon nanofibers," Applied Physics Letters, vol. 76, No. 24, pp. 3555-3557, Jun. 12, 2000.

Xueping, et al., "A method for fabricating large-area, patterned, carbon nanotube field emitters," Applied Physics Letters, vol. 74, No. 17, pp. 2549-2551, Apr. 26, 1999.

Merkulov, et al., "Scanned-probe field-emission studies of vertically aligned carbon nanofibers" Journal of Applied Physics, vol. 89, No. 3, pp. 1933-1937, Feb. 1, 2001.

Bonard, et all, "Field emission from single-wall carbon nanotube films" Applied Physics Letters, vol. 73, No. 7, pp. 918-920, Aug. 17, 1998.

Xueping, et al., "Carbon Nanotube-based vacuum microelectronic gated cathode," Material Research Society Symposium, vol. 509, pp. 107-109, 1998.

Dean, et al., "The environmental stability of field emission from single-walled carbon nanotubes" Applied Physics Letters, vol. 75, No. 19, pp. 3017-3019, Nov. 8, 1999.

Wang, et al., "Flat panel display prototype using gated carbon nanotube field emitters," Applied Physics Letters, vol. 78, No. 9, pp. 1294-1296, Feb. 26, 2001.

Lee, et al., "Realization of Gated Field Emitters for Electrophotonic Applications Using Carbon Nanotube Line Emitters Directly Grown into Submicrometer Holes," Advanced Materials Communications, vol. 13, No. 7, pp. 479-482, Apr. 4, 2001.

Guillom, et al. "Microfabricated field emission devices using carbon nanofibers as cathode elements", Journal of Vacuum Science Technology B19(6), pp. 2598-2601, Nov./Dec. 2001.

Ebbesen, Production and Purification of Carbon Nanotubes, pp. 139-191, and pp. 238-251, 1997.

Commercialization Advances in Large-Scale Production of Carbon Nanotubes, The Knowledge Fopundation, Inc., Apr. 22-23, 1999.

Colbert, D.T., et al., "Growth and Sintering of Fullerene Nanotubes", *Science*, vol. 266, pp. 1218-1222., Nov. 1994.

Yudasaka, M., et al., "Mechanism of the Effect of NiCo, Ni and Co Catalysts on the Yield of Single-Wall Carbon Nanotubes Formed by Pulsed Nd:YAG Laser Ablation", *J. Phys. Chem B*, 103, pp. 6224-6229, May 13, 1999.

*Lockheed Martin Today*, vol. 5, No. 5, May 1999.

Ren, Z.F., et al.,"Large Arrays of Well-Aligned Carbon Nanotubes", (Abstract),Document ID No. 31618, *1999 Fall Meeting, Symposium U: Amorphous and Nanostructured Carbon.*, Jun. 19, 1999.

Geohegan, David B., et al., "Time-Resolved Measurements of Carbon Nanotube Synthesis By Laser Ablation", (Abstract), *MRS 1999 Fall Meeting, Symposium U: Amorphous and Nanostructured Carbon*, Jun. 22, 1999.

Yudasaka, M., et al., "Formation Mechanism of Single-Wall Carbon Nanotubes", (Abstract), Document ID No. 31059, *1999 Fall Meeting, Symposium U: Amorphous and Nanostructured Carbon*, Jun. 18. 1999.

Setler, A.A., et al., "Making Multiwalled Carbon Nanotubes Using Heat Treatment", (Abstract), Document ID No. 30443. *1999 Fall Meeting, Symposium U: Amorphous and Nanostructured Carbon*, Jun. 15. 1999.

Tsui Frank et al., "Molecular Beam Epitaxy Synthesis of Carbon Nanotubes", (Abstract), Document ID No. 33365, *1999 Fall Meeting, Symposium U: Amorphous and Nanostructured Carbon*, Jun. 21, 1999.

Jacques, David. et al., "Synthesis and Growth Mechanisms of Multiwalled Nanotubes", (Abstract), Document ID No. 31069, *1999 Fall Meeting, Symposium U: Amorphous and Nanostructured Carbon*, Jun. 18, 1999.

Smith, Brian W., "Synthesis of C$ (60)$ Chains Contained Within Carbon Nanotubes", (Abstract), Document ID No. 30850, *1999 Fall Meeting, Symposiuim U: Amorphous and Nanostructured Carbon*, Jun. 17, 1999.

Gao, Y., et al., "Dense Arrays of Well-Aligned Carbon Nanotubes Completely Filled With Single Crystallline Titanium Carbide Wires On Titanium", (Abstract). Document ID No. 31900, *1999 Fall Meeting, Symposium U: Amorphous and Nanostructured Carbon*, Jun. 20, 1999.

Bando. Yoshio, et al., "Single- and Multi-Walled Boron Nitride Nanotubes Produced From Carbon Nanotubes By A Substitution Reaction", (Abstract), Document ID No. 29815, *1999 Fall Meeting, Symposium U: Amorphous and Nanostructured Carbon*, Jun. 7, 1999.

* cited by examiner

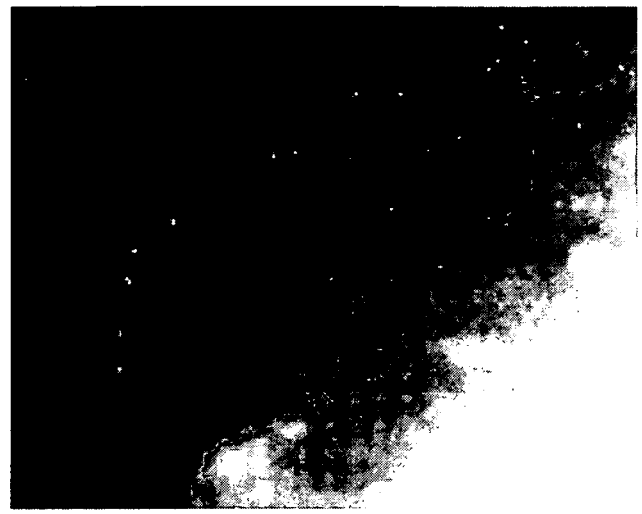
FIG. 5
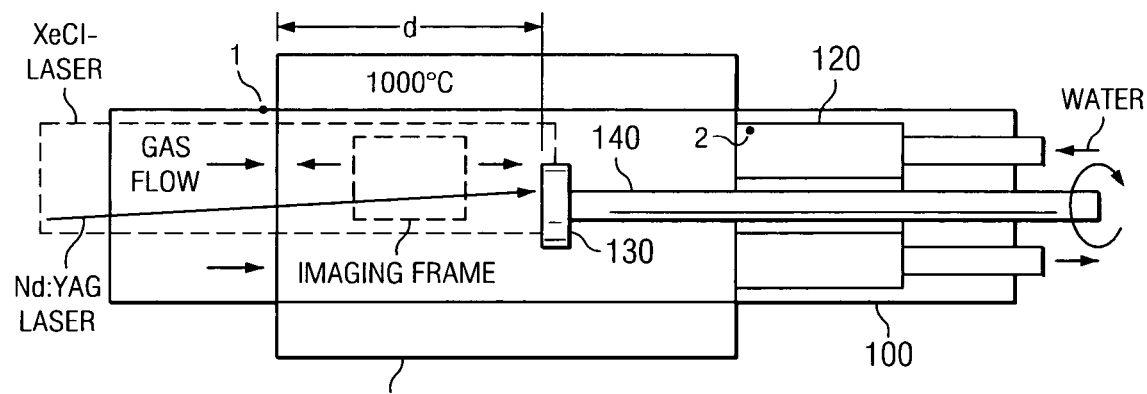
FIG. 6A
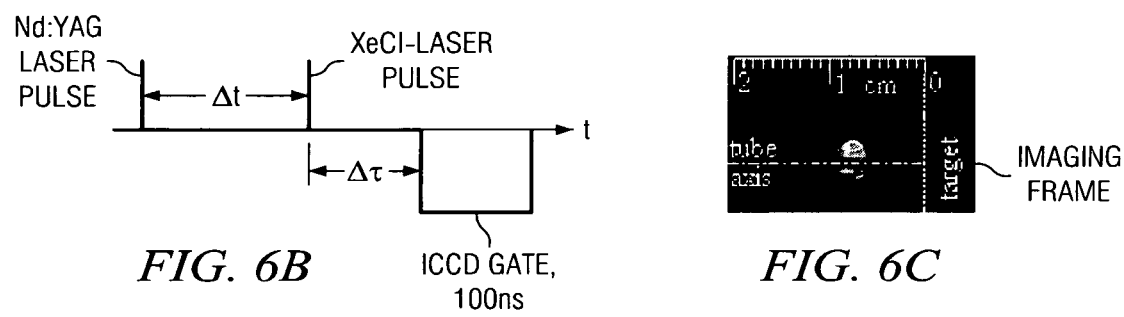
FIG. 6B          FIG. 6C

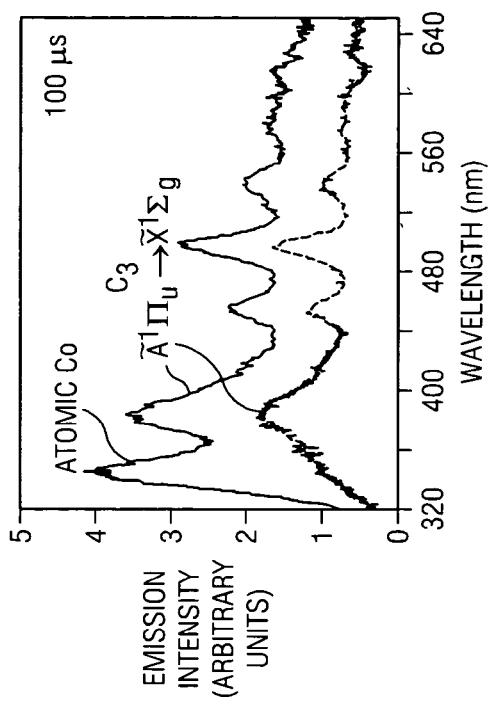
FIG. 9B
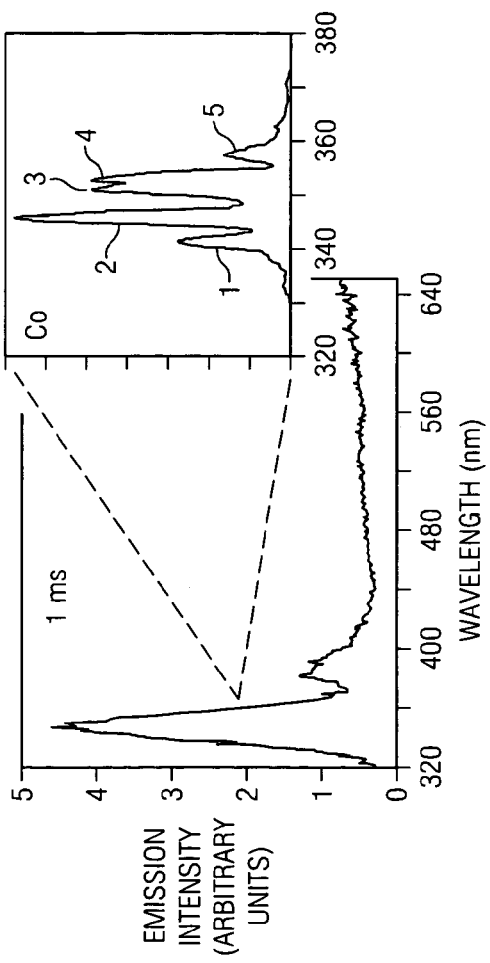
FIG. 9D
FIG. 9A
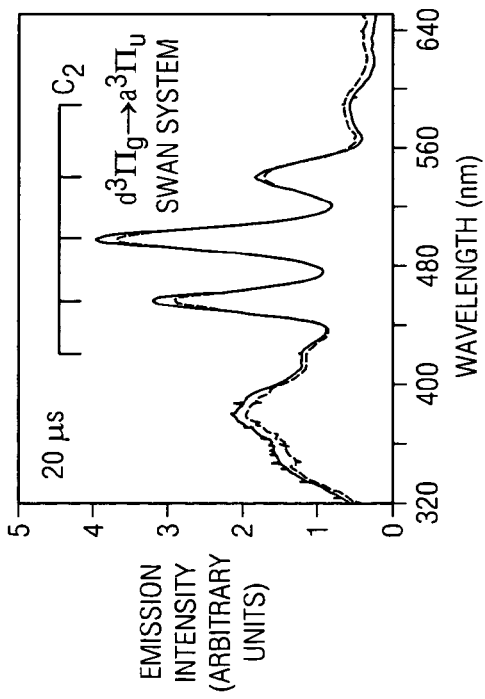
FIG. 9C

CONDENSED PHASE CONVERSION AND GROWTH OF NANORODS AND OTHER MATERIALS INSTEAD OF FROM VAPOR

This application is a continuation of and claims a benefit of priority under 35 U.S.C. 120 from Ser. No. 09/997,600, filed Nov. 28, 2001, now U.S. Pat. No. 6,923,946, which in-turn is a division of and claims a benefit of priority under 35 U.S.C. 120 from Ser. No. 09/449,844, filed Nov. 26, 1999, now abandoned, the entire contents of both of which are hereby incorporated by reference for all purposes.

STATEMENT AS TO RIGHTS TO INVENTIONS MADE UNDER FEDERALLY-SPONSORED RESEARCH AND DEVELOPMENT

This invention was made with Government support under contract No. DE-AC05-96OR22464 awarded by the United States Department of Energy to Lockheed Martin Energy Research Corporation, and Contract No. DE-AC05-84OR21400 awarded by the U.S. Department of Energy to Lockheed Martin Energy Systems, Inc., and the Government has certain rights in this invention.

BACKGROUND OF THE INVENTION

1. Field of the Invention

The invention relates generally to the field of materials science and engineering. More particularly, the invention relates to the condensed phase conversion and growth of nanorods and other materials.

2. Discussion of the Related Art

Carbon nanotubes are stretched versions of hollow fullerenes and can be thought of as fibers formed of perfectly graphitized closed seamless shells, with unique mechanical and electronic features sensitive to their geometry and dimensions. Carbon nanotubes were discovered by Dr. Sumio Iijima, a researcher specializing in electron microscopy at NEC's R&D group in Ibaraki, Japan, in 1991, while working on "buckyballs" or buckminsterfullerenes. Since this discovery, several groups have demonstrated the synthesis of various carbon nanotubes and have shown methods for collection, purification and incorporation of these carbon nanotubes in small components and composite structures.

Carbon nanotubes are a relatively new, elegantly geometrical material which can ignite a revolution in electronics, computers, chemistry, automotive, aerospace, defense programs and a myriad of structural systems. However, these improvements can only be realized if the manufacturing development aspects are addressed to "leap-frog" the present state of the art. All previous methods for forming nanotube materials are by vapor phase processes.

Heretofore, growth mechanisms for the formation of carbon nanotubes, both single-wall carbon nanotubes (SWCNTs) and multi-wall carbon nanotubes (MWCNTs), have not been understood. This has prevented the required "leap-frog" scaling to manufacturing technology for large structures.

Carbon nanotubes include both multi-walled carbon nanotubes (MWCNTs) and single-walled carbon nanotubes (SWCNTs). MWCNTs have exhibited ballistic conductance at room temperature. Ballistic conductance is a phenomenon in which electrons pass through a conductor without heating. A commercial approach to fabricating MWCNT would enable atomic and molecular-sized electronic devices that offer unique applications.

Single-walled carbon nanotubes (SWCNT) were discovered in 1993. Although SWCNT are currently only produced in small quantities, their remarkable electrical properties are rapidly being developed for commercial applications nearly as quickly as they are discovered. SWCNT are as small as 1 nm in diameter and can be up to 3 cm long. SWCNT have also exhibited ballistic transport (lossless current propagation) when used as metallic molecular wires.

SWCNT have the potential to add tremendous capability and functionality to future systems. Components fabricated from SWCNT would represent the strongest possible structural material with other unique physical properties. SWCNT structural materials would posses a strength to weight ratio of 812 to 1 over aluminum and 731 to 1 over titanium. SWCNT have already shown conductivities greater than copper at room temperature. SWCNT have exhibited both high thermal and electrical conductivities and could provide unique low observable components. Incredible potential for increased ballistics survivability if not invulnerability appears quite possible.

In addition, SWCNTs also possess other unique properties which hold even greater, almost unimaginable, economic opportunities and importance for our national energy and defense goals. SWCNT are the strongest material known to man, with over 1 TPa Young's modulus in the axial direction. Bundled SWCNT are predicted to have the largest strength-to-weight ratio of any known material, and promise new generations of lightweight, supertough structural materials which could replace metals in the bodies and engines of automobiles, aircraft, and ships, as well as form a new class of energy-efficient building materials. Single-walled carbon nanotubes are also highly thermally conductive, can withstand high temperatures, and are resistant to even strong acids. These features make them extremely desirable for aerospace applications. The weight savings benefits from SWCNT-construction would enable higher payloads for the next generation of space shuttles and airplanes. Alternatively, cables from SWCNT are predicted to be strong enough to hoist payloads from the earth's surface to orbiting space stations. Finally, SWCNT recently exhibited 8 wt. % hydrogen sorption (the highest for any carbon material) which make them desirable for hydrogen storage fuel cells for clean cars of the future.

Currently, structural applications of SWCNTs incorporate them in conventional fiber/epoxy systems. The SWCNT must be created, collected, purified, and then mixed with a matrix material for the production of composite structures (i.e., polymeric or resin composite structures).

By doing this, SWCNTs have not reached their full structural application potential. Limitations in the mechanical properties of the epoxy resins and costs associated with manufacturing using the fabrication processes associated with fiber/epoxy systems severely limit the capability and application of SWCNTs.

Currently SWCNTs are produced in laboratory-scale environments by 3 techniques at maximum rates of 16 grams/day. SWCNTs are produced by laser vaporization (LV) (approximately 1 g/day), electric-arc vaporization (AV) (less than 100 g/day) and most recently by chemical vapor deposition (CVD) (growth rates of 100 µm/hour, albeit over large areas). The LV and AV methods produce loose nanotubes which are grown in the gas-phase from co-vaporized carbon and approximately 1% catalyst metal. CVD utilizes thermal decomposition of a mixture of carbon-containing and metal-catalyst-containing precursor gases (e.g., methane and ferrocene) above a hot substrate. These methods are not suitable for direct fabrication of structural components. Minimum production rates of several kg/hour (roughly a factor of 1000 improvement) must be achieved for cost-effective replacement of current structural materials in high value-added products.

While recipes have been phenomenologically developed for synthesis of SWCNTs by each of the three methods described above, it is noteworthy that virtually no in situ diagnostics have been developed to characterize the growth process. As a result, the growth process is not understood and, consequently, these processes are not optimized.

In April 1999, a symposium was held in Washington, D.C. to address the problem of large-scale production of carbon nanotubes. Two conclusions were emphasized: First, the synthesis process must be understood and in situ diagnostics must be developed to help optimize it. Second, a high-volume industrial process must be developed at low cost.

SUMMARY OF THE INVENTION

Thus, a goal of the invention is the optimized fabrication of compositions that include nanorods that are at least partially interwoven, resulting in a composition of matter. Another goal of the invention is a low cost method of activating a condensed phase matrix material containing source into nanorods.

One embodiment of the invention is based on a composition, comprising: a plurality of nanorods that define a local volume, said local volume including a fraction, said plurality of nanorods within at least said fraction of said local volume interrelated to define (a) a substantially random distribution of intersection angles between said plurality of nanorods and (b) a localized packing density greater than 50% of a theoretical maximum packing density, which does not account for any voids within said plurality of nanorods. Another embodiment of the invention is based on a method, comprising: providing a condensed phase matrix material; and activating said condensed phase matrix material to produce a plurality of nanorods by condensed phase conversion growth.

These, and other goals and embodiments of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

A clear conception of the advantages and features constituting the invention, and of the components and operation of model systems provided with the invention, will become more readily apparent by referring to the exemplary, and therefore nonlimiting, embodiments illustrated in the drawings accompanying and forming a part of this specification. It should be noted that the features illustrated in the drawings are not necessarily drawn to scale.

FIG. 5 illustrates a transmitting electron micrograph of a bundle of single-walled nanotubes, representing an embodiment of the invention.

FIGS. 6A-6C illustrate schematic views of an apparatus for producing a condensed phase matrix material and nanorods, representing an embodiment of the invention.

FIGS. 9A-9D illustrate plasma emission (dashed lines) and laser-induced luminescence (solid lines) spectra from a condensed phase conversion and growth technique, representing embodiments of the invention.

DESCRIPTION OF PREFERRED EMBODIMENTS

Figure 1:
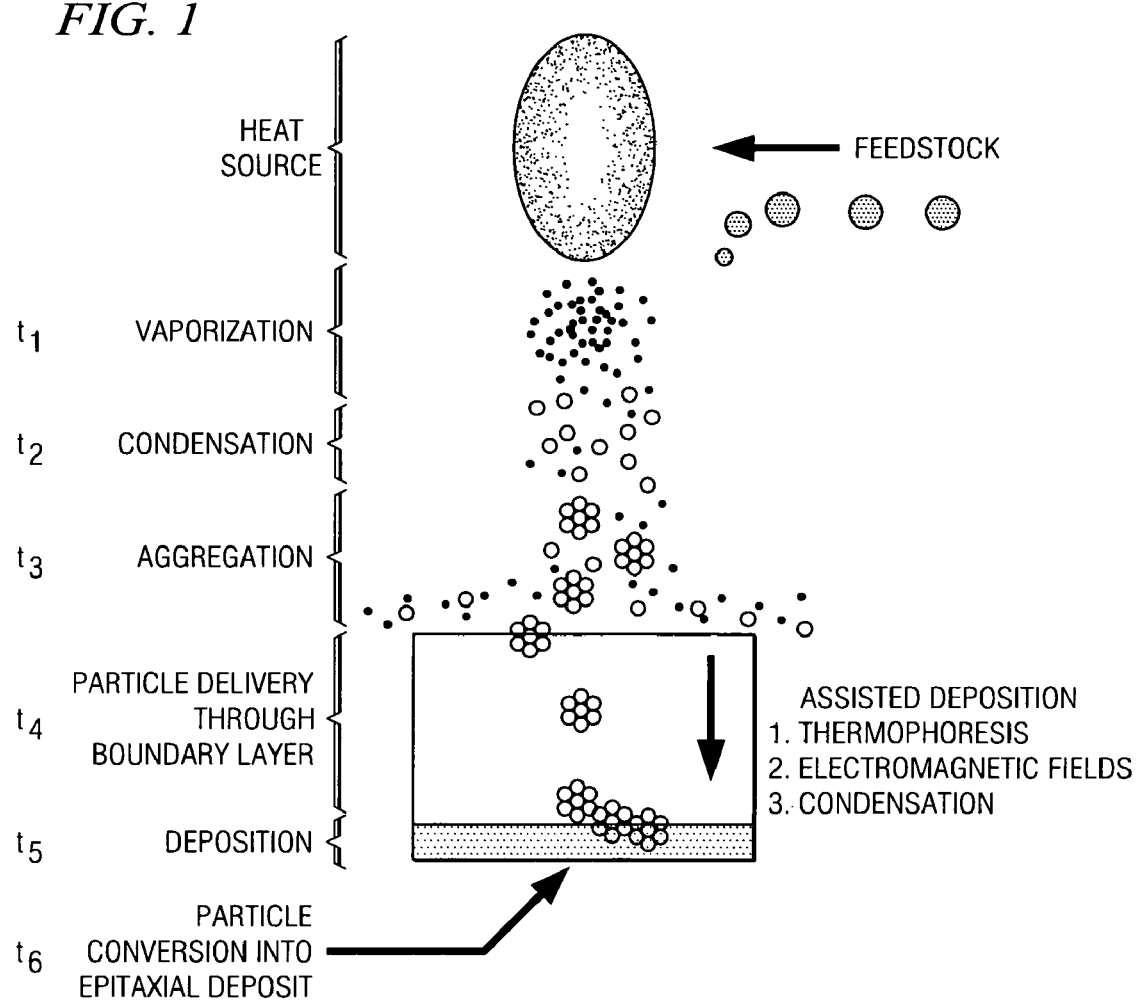
FIG. 1 illustrates a view of one approach to condensed phase conversion and growth, representing an embodiment of the invention.

The invention and the various features and advantageous details thereof are explained more fully with reference to the nonlimiting embodiments that are illustrated in the accompanying drawings and detailed in the following description of preferred embodiments. Descriptions of well known components and processing techniques are omitted so as not to unnecessarily obscure the invention in detail.

The context of the invention includes structural composite materials. The context of the invention also includes quantized conductance multi-value semiconducting behavior and nanoscale transistors. The context of the invention also includes arrays of patterned nanotubes as working field emitters for flat-panel displays and lighting.

The invention can include compositions that include nanorods. Referring to FIGS. 22A-22G, the nanorods can include solid or hollow nanostructures. The nanorods can include substantially cylindrical nanostructures (e.g., nanowires, single wall nanotubes, and multi-wall nanotubes). While substantially cylindrical nanostructues include nanotubes and nanowires which have a round cross section, the invention can include nanorods can include polygonal nanostructures (e.g., square, rhomboid and hexagonal). Preferred embodiment of the nanorods are elongated. The invention can also include arbitrary polygonal cross-section nanostructures as well as tapering fibrils. The nanorods can be at least partially interwoven to define intersection angles, as discussed below in more detail. The composition can have a packing density, as also discussed below in more detail.

The invention can include condensed phase matrix material grown by laser vaporization (e.g., soot particles and/or short nanorods) made by laser vaporization, arc, chemical vapor deposition, or any other technique(s). Deposited carbon and metal catalyst nanoparticles and clusters of nanoparticles were heated to result in solid-state conversion to carbon nanotubes.

The invention can also include in situ diagnostic techniques used to characterize the conditions for nanomaterial growth. These techniques were used to yield the first images and spectroscopy of carbon nanotube growth dynamics by laser ablation. These results indicate a new approach for cylindrical nanostructure growth which is capable of fulfilling the high growth rates and directed deposition needed for commercial scale-up toward structural applications.

In more detail, fundamental SWNT-synthesis experiments were performed with spectroscopic measurements which serve as in situ diagnostics of the manufacturing process. Furthermore, these results allow the use of high-volume manufacturing technologies for rapid nanotube growth, satisfying the needs and restrictions of commercial manufacturing. The invention includes increasing SWNT component manufacturing rates (by a factor of 100) for large-scale manufacturing is a major advance in materials science, with momentous implications for the synthesis of other materials.

Carbon nanotubes (CNT)s; including MWNT (multi-walled nanotubes) and SWNT (single-walled nanotubes) and other crystalline or amorphous materials can theoretically grow at extremely fast rates (cm/s axial growth for CNTs). However growth rates of epitaxial, adherent films of these materials often occurs at a demonstrated maximum rate approximately $10^6$ times slower. This disclosure outlines new solid state conversion approaches for growth of carbon nanotubes which defeat the limitation to achieve high-rate, directed-growth of carbon nanotubes at near-theoretical (cm/s) growth rates. These solid-state conversion and/or particle delivery methods are general and apply to high-rate bulk conversion or deposition of other materials onto surfaces. The invention can include the formation mechanism of carbon nanotubes, the growth of carbon nanotubes from heat-treated, annealed, or sintered mixtures of carbon powder and catalyst powder, methods for achieving such, and methods for the fabrication of components or structural materials with reasonable growth and/or deposition rates at least 100 times the presently demonstrated rate. Additionally, the invention shows that the formation of CNTs from condensed phase conversion and/or particles instead of from vapor. In order for SWCNT to reach their full potential, the fabrication of monolithic CNT structures, a production process needs to be devised that will allow (1) formation rates of CNTs necessary for reasonable production rates, (2) the near net shaped production of component structures, and (3) a number of manufacturing methods to be used including direct fabrication processes. The invention fulfills all 3 of these.

The invention can include a method for very rapidly growing carbon nanotubes from heat-treated, annealed, or sintered mixtures of carbon powder and catalyst powder. The method provides for conversion of solid or powdered material instead of vapor.

The invention can include an approach, methods, and strategies, termed condensed phase conversion growth, which when performed with solid feedstock can be termed solid state conversion growth and when performed by deposition processes can be termed solid-state particle conversion epitaxy, for rapid growth of carbon nanotubes and other crystalline materials at production rates that allow the manufacture and direct fabrication of components by, as one example, the following sequence of operations. Introduction of carbon-based feed material which is vaporized to form atomic carbon. Introduction of metal catalyst feed material which is vaporized to form atomic metal. The carbon forms nano-sized particles after an appropriate time which agglomerates and clusters. The metal catalysts forms nano-sized particles after an appropriate time interval at a later time compared to the carbon particles which agglomerates and clusters. The invention can include metal catalyst nanoparticles and carbon nanoparticles, as well as aggregates of these, as source material for the solid state conversion process. The deposited and/or collected carbon and metal catalyst particles are heated, sintered, or annealed to form the carbon nanotube structure. The particle-based supply is at a high rate sufficient to maintain the growth of the carbon nanotubes. The deposition is performed by a method to allow and achieve directed growth and/or directed deposition of carbon nanotubes. The directed growth is performed by a method to allow and achieve the specific shape and form of a specific component geometry and structure.

The source of the matrix material (e.g., carbon) and/or metal catalyst feed materials can be powder, wire, rod, gas, liquid, etc., in atomic and/or molecular forms and either fed independently or as a preblended material in the appropriate carbon-to-metal concentration ratio. The condensed phase source material can be a solid phase template. In embodiments of the invention where templates are used, they can be nanorods. To help ensure the production of single wall nanotubes, it can be an advantage to use templates that include single wall nanotubes. More generally, if the nanorods are used as templates, they can be previously prepared by condensed phase activation and growth.

The production of the source material by vaporization of the carbon and metal catalyst feed materials can be achieved by one of several rapid, high heat flux methods including CVD, laser, plasma energy, modified thermal spray processes (which include a number of processes such as plasma spray, combustion spray, flame spray, high-velocity oxyfuel of HVOF spray, or arc spray), arc processes, infrared radiation, microwave energy, etc. The production of the source material by vaporization of the carbon and metal catalyst feed materials can also be achieved by mechanical techniques such as fracture, grinding, etc, and/or by ion or laser beam coupled mechanical approaches such as, for example, laser-fracture or laser-surface modification, etc.

The heating, sintering, or annealing of the deposited or otherwise collected particle clusters can be achieved by one of several rapid, high heat flux methods including CVD, laser, plasma energy, modified thermal spray, arc processes, infrared radiation, microwave energy, etc., methods.

The process outlined above can be represented by the generic drawing shown in FIG. 1. Several specific processes will be described below to provide examples relative to the generic process depicted in FIG. 1.

FIG. 1 depicts an outline of the key elements to Particle Conversion Epitaxy process. Diffusion-limited transport is overcome by particle inertia and/or particle-assisted delivery to supply material to the substrate at high rates. Particle conversion by auxiliary heating is the method for rapid epitaxy, as in the case for carbon nanotubes.

The invention can include the use of (e.g., sub 100-nm diameter) catalyst metal particles (e.g., Fe, Ni, Co, Rh, Pa, or alloys containing these). An alloy of 50% Ni and 50% Co can be used.

The invention can also utilize data processing methods that transform signals from the nanorods to control the production and/or fabrication process. For example, the invention can be combined with instrumentation to obtain state variable information to actuate interconnected discrete hardware elements. For instance, Raman scattering can be used to measure the amount of nanotubes based on the amplitude of the received signal, characterize the diameter of the nanorods and/or determine whether they are metallic or semiconductor. The Raman scattering data to control the activation by changing the temperature (e.g., increase temperature), changing the powder feed rate of a source of condensed phase matrix material (e.g., decrease feed rate) and/or changing the concentration of a catalyst (e.g., increase catalyst concentration).

The invention can include a method to produce free-standing structures or components of carbon nanotubes whereby (1) the carbon nanotubes and/or carbon nanotube clusters with the appropriate concentration of nano-sized metal catalyst particles or clusters are deposited onto a mold, pattern, mandrel, or substrate tooling, heat-treated, annealed, or sintered to form a monolithic carbon nanotube structure, followed by removal of the mold, pattern, mandrel, or substrate tooling, to form the component. An example describing this practice is outline by the following sequence of operations.

An aluminum pattern or mold with internal cooling channels is produced by some technique such as forming, casting, or machining. The aluminum mold is coated with a very light coating of colloidal graphite using a cloth dampened with the colloidal graphite. The aluminum mold is nickel plated by some technique such as electrochemical deposition of a 0.001-in. or thicker coating. Carbon nanotubes and/or carbon nanotube clusters with the appropriate concentration of nano-sized metal catalyst particles or clusters are mixed to form a slurry (the particles, clusters, or powder and suspension medium are mixed to produce a homogeneous paint or slurry for deposition on the workpiece surface via brush- or spray-painting). The slurry is brush painted, spray painted, or otherwise deposited onto the nickel surface. The slurry deposited materials are heat-treated, annealed and/or sintered. The mold or pattern is removed by flowing liquid nitrogen to cool and shrink the aluminum mold relative to the carbon nanotube structure or component. The nickel skin maybe left with the part or removed.

Figure 24:
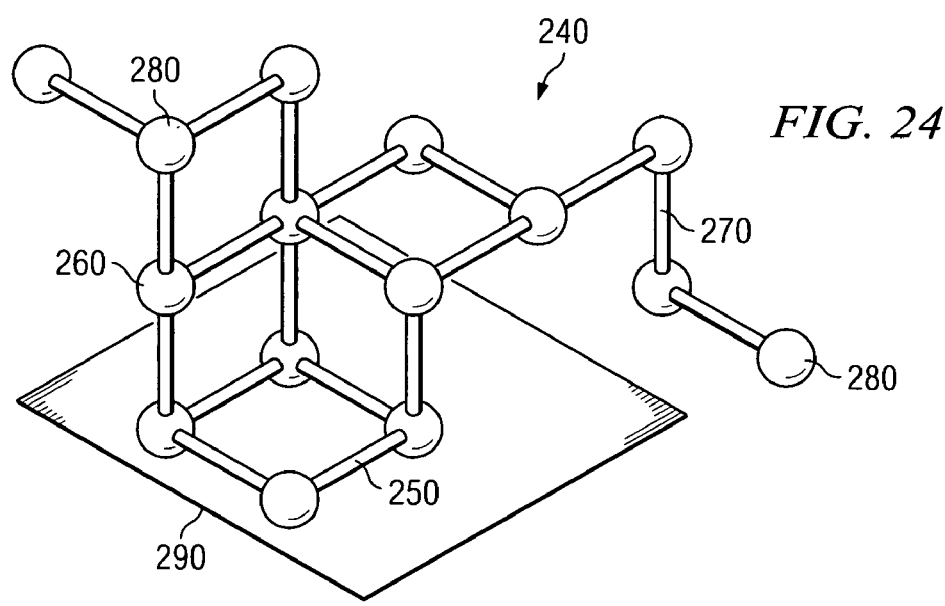
FIG. 24 illustrates a three dimensional structure including a composition, representing an embodiment of the invention.

On a generally smaller scale, the invention can include the three dimensional integration of matrix material by a series of lithographic (or other 2D) steps to provide a 3D structure. In this way, a 3D structure of interconnected circuits can be fabricated in one (or more) processing step(s). Referring to FIG. 24, a 3D structure 240 is depicted. The 3D structure 240 includes a first layer 250, a second layer 260, and vertical interconnects 270. Optional catalyst particles 280 are shown at the interconnections between the individual members that compose the 3D structure 240. The entire network can be packed in a filler material (not shown) and then activated and grown (i.e., converted) in one step. The 3D structure 240 can be coupled to a substrate 290. The substrate 290 can be flat or curved as shown in FIG. 24.

Recently, however, we demonstrated a proof-of-principle study that carbon nanoparticles and catalyst nanoparticles can form carbon nanotubes if they are annealed at approximately 1200° C. This provides the opportunity, for the first time, to attempt particle-based deposition of carbon and catalyst particles to satisfy high-rate nanotube growth. The powder-delivery method must be capable of supplying sub-100 nm particles to the surface, unlike conventional thermal spray. This technique can be termed solid-state nanoparticle conversion epitaxy.

Methods

Preferred methods supply enough material to the film surface to satisfy rapid condensation at near-theoretical growth rates (Carbon nanotubes: 10 cm/s). Preferred methods should also provide the correct temperature and excitation conditions for transformation of feedstock into nanotubes on the growing surface.

Method 1

Thermal, spray involving carbon feedstock powder and metal catalyst powder injection. With proper choice of powder size, standoff distance, substrate temperature, feed rates, gun design, power level, arc gas content, and other parameters typical of thermal spray processes, it is possible to adjust the flux of material arriving near the surface to consist of nanoparticles with the excess plasma torch carrier gas (e.g. Ar, Ar/He, or Ar/H2 such that the subsequent solid-state conversion provides a rapid growth sufficient to achieve component fabrication.

Method 2

Powder delivery plus laser heating of the powders near boundary region Any powder delivery mechanism supplying powders to the surface, coupled with laser heating, fracture, or vaporization of the powders at the substrate. The powder delivery achieves the proper feed rate to the surface while the laser supplies the energy required for conversion into nanotubes.

Method 3

Thermal Spray or CVD and Extremely Rapid Cluster Condensation Any vapor-delivery method in which the vapors are converted to clusters en route to the substrate of size large enough for deposition, coupled with plasma excitation, laser excitation, or substrate heating capable of conversion into nanotubes on the surface.

Method 4

A particle-driving technique can be used. These following techniques may be used in conjunction with the above techniques, or separate from them. Laser generated particles coupled with laser heating of the particles en route. Electromagnetic deposition—Arrangement of electrostatic, magnetic, or combined fields to induce transport of charged particles to the surface. Internal fields within plasmas, plasma torches, rf-plasmas, etc. which accomplish this task or external fields from parallel plates, coils, electromagnets, magnets, etc. are included in this approach. Conversion-driven deposition—Inducing a feedstock (gas, nanoparticles, etc.) numberdensity flow deposition due to the rapid conversion of nanoparticles to epitaxial carbon nanotubes on the substrate, resulting in an increased flow of feedstock to the substrate due to diffusion.

Method 5

A pure feedstock vapor or feedstock particle delivery technique can be used. Any laser vaporization or particulate generation technique which permits the delivery of feedstock particles and/or vapor to the substrate surface without carrier gas. Laser vaporization of tapes or wires, relying upon the momentum given the material from the plume expansion process. Explosive vaporization of tapes or wires, by electrical or other technique, for the same purpose.

Method 6

An infrared high heat flux method can be used. IR radiation heating provides a technique for rapidly heating the feed stock carbon-based and metal catalyst materials and/or the deposited carbon and metal catalyst clusters or particles. The later heating or sintering effects the particle conversion into an epitaxial deposit. IR radiation heating provides a technique for rapidly heating the feed and/or deposited material while maintaining a substantially lower workpiece substrate or mold temperature. Infrared radiation heating is preferably performed in an IR heating furnace. A variety of IR sources are available. For instance, Infrared Technologies, LLC, located in Oak Ridge, Tenn., manufactures specialized IR furnaces which incorporate tungsten-halogen based IR sources. A more powerful IR furnace, incorporating a plasma-based IR source, is manufactured by Vortek, Inc. of Vancouver, Canada. This particular plasma-based furnace operates as a line-focus type system, whereby the coating is treated by scanning across the coating surface.

By maintaining the workpiece temperature below a critical value, the deposited clusters or particles are modified while controlling the microstructure of the underlying workpiece material. The temperature to which the coating is heated is accurately controlled by varying the intensity of IR radiation and the time of exposure to the IR radiation source. The intensity of IR radiation and time of exposure to IR radiation will vary, depending on characteristics of the workpiece and deposited carbon-metal catalyst materials, and the modification or enhancement desired. For most applications, the IR exposure time ranges from 5 to 300 seconds, with an exposure time of 30 to 60 seconds preferred. The preferred IR intensity, or heat flux density, will generally range up to a maximum value of about 3,500 Watts/cm$^2$ However, these variables are application specific and may be deviated from. For instance, particular applications may incorporate nonuniform and/or noncontinuous heating profiles.

Infrared heating rapidly increases deposit density by eliminating pores formed in the coating during deposition and, in some cases where a binder and/or carrier materials are used as in a slurry, for curing or evaporating the binder/carrier materials. IR heating may also used to improve the cohesiveness of the coating material and/or the adhesion of the coating material to the workpiece surface. It may be desirable to heat a portion of the workpiece surface, in addition to heating the coating, such that the microstructure of the heated portion of the workpiece surface is altered. The degree to which the workpiece surface microstructure is altered depends on a number of factors. including the respective workpiece and coating materials used, and the microstructural properties desired.

The step of IR heating may be controlled to initiate various material microstructure modifying mechanisms, including sintering, alloying and precipitation. In the present method, sintering refers to densification and chemical bonding of adjacent particles which is effected by heating to a temperature below the melting point of both the workpiece and deposited materials. Sintering may occur at the interface between the deposited material and the underlying workpiece surface to improve interfacial adhesion. In addition, sintering may occur within the deposited material itself, to improve densification and mechanical strength of the deposited material. The term alloying refers to heating the workpiece and deposited materials above their respective melting points to produce an interface comprising a mixture of the workpiece and deposited materials. Alloying is a desirable mechanism for producing improved adhesion between the deposited material and underlying workpiece surface. The term precipitation describes a material modification process whereby the material being modified, i.e., the deposited material and/or the workpiece surface, is heated to produce a new solid phase which gradually precipitates within the particular solid alloy material as a result of slow, inner chemical reaction.

The present method can be performed in vacuum, air, or controlled and inert environments. Infrared heating is unique in that it can be applied to complex surface geometries with nominal effect on heating system geometry. Commonly used high heat flux methods require physical coupling to the deposited material surface, for example, with an induction coil. However, where the workpiece surface comprises an obscure geometry, a typical induction coil will not couple uniformly to the entire surface. Therefore, avoiding nonuniform heating of the deposited material surface requires specially designing a coil which follows the contours of the particular workpiece. Using the instant IR heating method, the specific intensity of the thermal energy may decrease as a function of distance between the IR source and the deposited material surface due to dispersion of the radiation. However, in contrast to known methods, this decrease in energy is nominal. Therefore, regardless of surface geometry, the deposited material on the workpiece can be uniformly heated. The instant method provides the further advantage of enabling the flexibility to heat, and thereby treat, a specified portions of a surface. This is possible since the IR radiation may be directed or focused toward a particular area.

The condensed phase conversion of liquid, particles or solid materials into nanotubes, overcomes three challenges which has until the present date limited the rapid or a reasonable growth rate of CNTs and manufacturing of monolithic components: Understanding SWNT growth, and what currently limits increased growth rates; Developing methods for direct-deposition of SWNT at high rates; Developing in situ diagnostics to help understand and optimize directed SWNT growth.

Experimental growth rates can be easily measured for CVD (approximately 10 µm/min), however growth rates from LV and AV are uncertain since no investigations have determined the residence time of the reactants in the growth zone. Recently, we performed the first such measurements for LV, indicating that SWNT spend several seconds in the oven, yielding a time-averaged growth rate approximately 1-10 µm/s. The instantaneous growth rate may be much higher, depending upon the actual time the feedstock in the vapor plume is available for growth. For example, using theoretical estimates of the time available for AV growth (0.3 ms) and the very long (100 µm) SWNT found, instantaneous growth-rates may be as high as approximately 30 cm/s.

For cost-effective direct manufacturing of structural components, SWNT must be deposited at a minimum of approximately 0.5 kg/hour (0.061 cm$^3$/s) into a directed area of no more than 5 cm$^2$ for a linear deposition rate of 0.01 cm/s. The magnitude of this materials-synthesis challenge becomes clear when one considers that: a total of <100g of SWNT have ever been synthesized by LV; the 0.5-kg quantity of SWNT requested in one hour would require over 30 days of continuous AV-production; the current CVD growth-rate (0.000017 cm/s) is approximately 1000 times too slow.

On the other hand, the required growth rate is 1000 times less than the estimated theoretical growth rate of 10 cm/s. Of the three current techniques to grow SWNT, CVD is the only one capable of directly-depositing SWNT into structural components. The tubes can be grown directly onto substrates, nearly-free of carbon soot, and in an aligned way. However, it appears that CVD is not capable of fulfilling the requirements for high-rate directed growth, because the growth-rate is diffusion controlled.

The invention can include methods capable of delivering the high mass rates of material and overcoming gas diffusion are particle-based coating techniques, such as thermal plasma spray techniques (that is, plasma spray, combustion spraying, arc spraying, etc.). The invention can include particle-based delivery techniques are used as the vehicle for rapid carbon nanotube growth. Other rapid, high heat flux methods, such as infrared radiation, laser, microwave energy, plasmas, and arc, may also be incorporated in the process to either vaporize the carbon based materials and the metals forming the catalysts particles and/or subsequently heat the deposited particles to form the CNTs.

For example, carbon nanotube growth by laser vaporization has shown that SWNT growth results from nanoparticles of carbon in contact with catalyst nanoparticles. The carbon condenses into nanoparticles first, then the metal catalyst condenses into nanoparticles; both are accomplished within milliseconds after laser vaporization. Both remain in nanoparticle form (rather than atomic or small clusters) as growth continues for extended times (e.g., seconds). When growth continues for extended times (seconds), small amounts of $C_3$ are liberated as a byproduct. This shows that once initiated, SWNT growth will continue if the temperature is maintained and sufficient feedstock is supplied. Optimal SWNT growth conditions can be attained with a high-volume feedstock-delivery technique such as modified thermal plasma spray. Other particle-based delivery techniques can also be used as the vehicle for rapid carbon nanotube growth. These include rapid, high heat flux methods, such as infrared radiation, laser, microwave energy, plasmas, and arc, to either vaporize the carbon based materials and the metals forming the catalysts particles and/or subsequently heat the deposited particles to form the CNTs.

Proof-of-Principle Experiment

Well-controlled, proof-of-principle experiments recently performed revealed that carbon nanotubes can be grown from heated mixtures of carbon and catalyst particles. Carbon and metal catalyst particles of different sizes were co-deposited by pulsed laser vaporization in varying pressures of background gases (using unique in situ diagnostics) and sized by TEM, AFM, and FESEM. These particle mixtures were heated in vacuum and in background gases using resistive heating elements and auxiliary laser-irradiation or plasma spray excitation. Nanotube growth was investigated by TEM investigation. The task demonstrated the growth of nanotubes from mixed particles. This task alone is a major scientific and technical milestone.

Normal plasma spray involves powder-feeding a plasma torch to melt micron-sized particles and direct them at high-velocity toward a substrate. Molten particles are accelerated to the substrate where they impact, splat, and cool very rapidly. The torch simultaneously deposits the particles, heats the substrate, and resolidifies the deposit. For high-volume carbon nanotube growth, particle size or cluster size of nanoparticles is allowed to increase to achieve high enough deposition rates desirable for rapid conversion to nanotubes.

The invention can include (i) growth of carbon nanotubes from mixed powders, (ii) deposition of nanostructured carbon at near-powder-delivery rates for a modified thermal spray technique, and (iii) solid-state conversion into nanotubes.

Description of Proof of Principle Experiment

In order to demonstrate the feasibility of the proposed mechanism of carbon nanotube growth, i.e. the solid-state transformation (sintering, annealing, etc.) of particles into carbon nanotubes, a proof-of-principle experiment was performed. A composite target of graphite with micronized powders of 1 at. % Ni and 1 at. % Co was laser-vaporized at room temperature in several Torr Ar under conditions known to condense large quantities of nanoparticles in the 1-20 nm diameter size range. Two nichrome strips were attached to the unirradiated target surface to collect the particles which were redeposited back onto the target. One sample was removed as a control, and a sample of the redeposited soot was collected on a TEM grid and examined by TEM. Many nanoparticles in the predicted size range were found, mainly attached in larger aggregates of these particles. No nanotubes could be found in this sample, one of the sooty nichrome strips was returned into vacuum and annealed for five minutes by passing approximately 10 A of current through it until it reached a temperature in excess of 1000° C., as judged by comparing its color to that of a 1000° C. oven. This sample was analyzed in the same manner as the control sample. Four TEM images of this sample are shown below (FIGS. 2-5). Regions of soot contained many carbon nanotubes. Mostly multiwalled carbon nanotubes (MWNT) consisting of several concentric layers were found (FIGS. 2,3) however some bundles of single-walled carbon nanotubes (SWNT) (FIGS. 4,5) were also found. This indicates the feasibility of annealing powder deposits to form carbon nanotubes.

Furthermore, another similar experiment was performed by collecting nano-sized powders on a cold finger, depositing them inside a quartz tube under argon, and flash-heating them from the outside with a torch until they glowed bright orange (estimated temperature 1000° C. and higher). Very similar results to those given above and shown in FIGS. 2-5 were obtained.

Figure 2:
FIG. 2 illustrates a transmitting electron micrograph of a mosaic of multi-walled nanotubes, representing an embodiment of the invention.

FIG. 2 depicts an annealed soot sample, originally C/NI/Co nanoparticles created by laser ablation. A mosaic of multi-walled nanotubes (MWNT) is evident in this overfocused image. Many MWNT are protruding from the soot boundary. TEM Image 1373, ORNL-Magnification 60000-Sample 2A-Full width of frame=870 nm.

Figure 3:
FIG. 3 illustrates a transmitting electron micrograph of multi-walled carbon nanotubes protruding from an annealed soot sample, representing an embodiment of the invention.

FIG. 3 depicts a close-up of multiwalled carbon nanotubes protruding from annealed soot sample, (originally C/Ni/Co nanoparticles created by laser ablation). The hollow center of the tubes is resolvable. The annealed sample is densely packed nanotubes, where none were evident in the unannealed sample. ORNL-Magnification 60000-Sample 2A-Full width of frame=870 nm.

Figure 4:
FIG. 4 illustrates a transmitting electron micrograph of a long bundle of single-walled carbon nanotubes protruding from an annealed soot sample, representing an embodiment of the invention.

FIG. 4 depicts a long bundle of single-walled carbon nanotubes protruding from an annealed soot sample, (originally C/Ni/Co nanoparticles created by laser ablation). TEM Image 1376, ORNL-Magnification 80000-Sample 2A-Full width of frame=625 nm.

FIG. 5 depicts a close-up of bundle of single-walled nanotubes protruding from annealed C/Ni/Co nanoparticles created by laser ablation Jun. 3, 1999. The single-walled nanotubes, spaced approximately 1 nm apart, can be resolved in the top art of the bundle. TEM Image 1375, ORNL-Magnification 410000-Sample 2A-(Jun. 4, 1999)-Full width of frame=85 nm.

Solid State Carbon Nanotube Formation

Further experiments have shown the solid-state conversion of carbon and catalyst into carbon nanotubes. Solid-state conversion of carbon powders and metal catalyst was shown by the following: Mixed catalyst and carbon powders were flamed heated for just a few seconds. Analysis using the TEM revealed that long (half-micron length) nanotubes had been produced. This is extremely important because only a quick initial burst of energy is necessary to convert and grow long nanotubes.

The fundamental mechanism is that catalyst particles can be put in contact with any carbon feedstock to form carbon nanotubes when heated. Our results indicates that transient heating (low-temperature overall) is all that is required, thereby enabling processing of carbon nanotubes directly for molecular electronics.

Directed Growth of Nanotubes for Molecular Electronics: A wafer can be lithographically patterned with metal catalyst nanoparticles. Many people are currently flowing CVD-gas over top of wafers to grow nanotubes at high temperatures. But you would like to have the nanotube grow from point A to point B to make an electrical wire contact. How? By CVD they grow where they want, toward the gas flow, like spaghetti. Significantly, the invention can include providing a line of amorphous carbon soot (feedstock) between A and B for growth to follow. Upon transient heating, nanotubes will grow along this feedstock path between A and B. The unreacted soot could be easily etched or washed away, leaving a network of molecular wires which are of nanometer width. There is a HUGE effort nationwide to find ways to do this for sub-100 nm lithography for the next generation of computer chips. No one has dreamed of converting solid carbon to nanotubes. Also, by patterning (by shadow evaporation) different layers in a sandwich structure, and then heating the block, one could make 3D interconnects.

Additionally, the growth between A and B points can be accomplished by writing the metal catalyst pattern using lithographic techniques, laser deposition, PVD with masking, etc., onto a carbon surface and subsequently rapidly heating or thermally treating to cause the solid state conversion.

The invention can include directed growth of nanorods for structural componentss Nanotubes can be grown directly by layering the feedstock in grids or 3D-architectures which should have a high structural integrity upon conversion to nanotubes. The problem has always been how to get the nanotubes to grow in the direction you wish. For example, inert spheres with thousands of nanoscopic points could be coated with metal catalyst film or nanoparticles and packed at the right density with the carbon powder, etc. to form (when heated quickly) an interlocking mesh of carbon nanotubes. Or simply building-up a freeform structure out of feedstock, such as carbon materials, and catalyst particles to be fired or rapidly heated by one of many technique as outlined earlier, for the solid-state conversion into nanotubes.

The invention can include solid state conversion of carbon feedstock and metal catalyst particles (or other catalytically-grown material such as Si, SiC, TaC, etc. with the corresponding catalyst particles) into nanotubes (or nanowires) from lithographically-patterned, self-organized, or otherwise patterned lines by directed-growth (along, between, or counter to the pattern) of the feedstock caused by thermal treatment. The invention can include making nanotube or nanowire interconnects, junctions, transistors, or other molecular electronic devices or elements. The invention can include making strong predesigned structurally-tough patterned composites. The invention can include patterning the metal catalyst onto spray painted or otherwise deposited carbon powder or slurries of carbon particles. The invention can include nanotube or nanowire formation by solid state conversion of particles.

The invention can include the formation of carbon nanotubes by the rapid conversion-of particle mixtures of carbon and catalyst powders. Small particles or nanostructures have quite different properties than that of the bulk material, permitting sintering or melting at lower temperatures, and that, as examples given below, the particles may be formed or introduced and, then, by some deposition of energy or heat, such as outlined previously, the particles are subsequently heated rapidly to form carbon nanotubes by the solid-state conversion. The invention can include any method by which particles of carbon are prepared in contact with metal catalyst particles and heated to form carbon nanotubes.

The particles may be prepared as (a) pre-mixed dry particles, (b) deposited particles as those electrosprayed, blown, painted, deposited by pulsed laser deposition, or other deposition techniques, (c) slurried, colloidally precipitated, or mixed into a liquid paste mixture, for firing in molds or painting as coatings. The particles may be created by another method, such as laser ablation of a solid piece of carbon, arc-vaporization of carbon to produce small particulates, grinding, fracture, explosive production, ion-implantation and annealing, plasma heating, infrared heated, or other method.

A solid surface may be roughened (by mechanical technique, such as ion or electron beam etching, grit blasting, or bombardment with $CO_2$ pellets, or with a laser, ultrasound, heat, etc.) to form small-diameter protrusions or regrown structures which have small diameters. In this regard, no particles are deposited. Nevertheless, the invention can include the use of these small-diameter protrusions, if reacted catalytically with catalyst particles, cluster or vapor, as particle-feedstock for nanotube (and/or nanostructure) growth.

The invention can include other forms (e.g., nanowires) and other materials (i.e., non-carbon): —Because carbon does not melt, but rather sublimates, the structural transformation by which it may dissolve into molten nickel, cobalt, or other catalyst is not clear. The action of the catalyst particle appears to be to decompose the carbon bonds in proximity with it, as in sintering, once decomposed, the carbon either rapidly diffuses through the molten particle or around it, to deposit pure carbon on the other side. The rate of nanotube growth may be estimated by the diffusion rate of carbon into molten nickel at 1200° C. for example. This is very similar to the VLS growth mechanism (vapor liquid solid) proposed for nanowire formation (Lieber, Harvard) where he demonstrated Si, SiC, TiC, nanowire formation with catalyst particles and what he outlined as atomic vapor.

The invention can include the feature that catalyst nanoparticles and feedstock nanoparticles are in contact with one another, precipitating nanowire growth, by a solid-state conversion process. Thus, the invention can include the growth of nanowires of many materials by particle-particle (catalyst/feedstock) conversion.

A 1-nm catalyst particle is believed to precipitate a 1-nm diameter carbon nanotube (a SWNT, single-walled carbon nanotube). Such a 1-nm particle can be called a cluster since it contains only 25 atoms. For carbon, hollow clusters called fullerenes have unique geodesic shapes consisting of 60, 70, 84, etc. carbon atoms. The formation of carbon nanotubes from fullerenes is an obvious starting point, since nanotubes are simply extended fullerenes. Therefore, our particle concept includes fullerenes, since the active particle sizes (nanoparticles) appear to include the fullerene size range. The volume production of fullerenes is possible and conversion is an easy extension in the context of the invention. Therefore, the invention can include the fullerene conversion into carbon nanotubes, and also the solid-state conversion of other carbon materials as well as noncarbon materials into nanotubes and/or cylindrical nanostructures.

The invention can include methods used to manufacture components including: molded parts, such as engine blocks, airplane shells, aircraft wings, boat hulls, injection-molded items—a slurry of nanoparticle paste (metal catalyst with carbon particles for carbon nanotubes) is injected into the mold and rapidly fired or heated. Nanotubes grow into a tough, lightweight, structural composite. Coatings—such as for stealth fighters, protective coatings on ships, etc.—a slurry of carbon and catalyst nanoparticle paste is painted and fired, or a particle-based coating technique such as thermal spray, is used to deposit and convert the particles into nanotubes, by solid state conversion, directly in one step. Direct fabrication of structural parts—such as for aerospace parts of complex shapes, automobile parts, hollow pieces, etc.—a particle-based delivery technique is coupled with a laser, infrared heat source, plasma source, or other excitation source to effect the particles conversion into nanotubes. Thin Films and multilayers—for electrical or thermal conductivity, superconductivity, particle mixtures are layered into a stacked multilayer film and then annealed or treated by a rapid heating process, as previously outlined, to form alternating layers of carbon nanotubes. Nanotube bundles, cables, wires—A composite slurry of the carbon and catalyst particles is mixed, rapidly and continuously fired to produce bundled nanotube cables of incredible strength. A composite slurry, paste, paint, suspension, etc., of the carbon and catalyst particles are extruded, formed, or cast into molds or patterns, as by conventional manufacturing methods, and subsequently heat treated by a rapid, high heat flux heat method, such as infrared, plasma, microwaves, radiant, etc., to produce a component of nanotube materials. A composite slurry, paste, paint, suspension, etc., of the carbon and catalyst particles are blown or extruded into blow-molds or patterns, as by conventional manufacturing methods for polymeric or plastic components, and subsequently heat treated by a rapid heat flux heat method, such as infrared, plasma, microwaves, radiant, etc., to produce a component of nanotube materials. The carbon powders are deposited by powder spraying, such as electrostatic spraying, etc., and the metal catalyst particles are co-deposited or deposited subsequently, followed by the rapid thermal treatment.

The invention can include solid state nanotube and nanowire formation by reaction of catalyst particles with various forms of carbon feedstock. Whereas the much of the description above refers to slurries of powders which were subsequently annealed to form solid nanotube structures, or deposition of particles for subsequent heating and solid-state conversion, and to catalyst particles on solid textured surfaces which create nanotubes by the solid-state conversion, the invention can include the interaction between small catalyst particles and any size carbon material or powder, and any size block of carbon (arbitrary particle size), or carbon containing feedstock (like a polymer, or hydrocarbon liquid). The invention can include the interaction between small catalyst particles and their ability to convert any solid form of carbon or carbon-containing feedstock into carbon nanotubes. The invention also includes other elements/materials and the formation of either solid or hollow nanowires from the interaction of small catalyst particles with, for example, silicon feedstock to form silicon nanowires.

The invention can include the formation of carbon nanotubes (or other type of nanotubes or nanowires) through the interaction between heated catalyst nanoparticles and solid carbon, such as a carbon block, amorphous or vitreous carbon, carbon soot (or equivalent for silicon, etc,). The invention can include the formation of carbon nanotubes (or other type of nanotubes or nanowires) through the interaction between heated catalyst nanoparticles and solid or liquid hydrocarbons, such as polymers, oils, rubbers, or equivalent interaction for silicon, silicone oils, etcetera. The invention can include the formation of aligned carbon nanotubes (or other type of nanotubes or nanowires) on carbon substrates through the heating of catalyst particles which are patterned on the top of the substrate (similar for silicon, silicon carbide, titanium carbide.

Heating methods that can be used as part of the invention can include pulsed or CW lasers, RF, microwave, plasmas, rapid radiant heaters, light sources including UV, VUV, or IR lamps etc. The catalyst nanoparticles may be synthesized and/or put in contact with the solid or liquid carbon or carbon feedstock by a variety of techniques, including (a) physical mixing, spraying, etc., of preformed nanoparticles, (b) chemical reactions leading to condensation or precipitation of the nanoparticles, (c) vaporization of solids or liquids followed by gas phase condensation and collection or coating, (d) deposition of vapors onto surfaces or into liquids followed by nucleation and growth of clusters and nanoparticles, and, then, rapidly heated by any technique such as those outlined above, to cause the solid-state conversion into nanotubes producing the component.

The invention can include any powder delivery technique, including liquid slurries, painting, blowing, injection molding, etc., followed by heat treatment conversion to form nanotubes. The invention can include nanotubes that can grow during laser ablation from mixtures of nanoparticles over several seconds of time.

The invention can include nanotubes that are grown outside the ablation chamber from the raw, laser-ablated carbon/metal nanoparticle mixtures produced at low temperatures, and annealed by various treatments. Both multiwalled nanotubes (MWNT) and single-walled carbon nanotubes (SWNT) have been grown.

We annealed soot which contained short SWNT in the early stages of growth, to see if further annealing would provide more SWNT, MWNT, or no growth at all. We found that the short SWNT continued to grow into longer SWNT.

Figure 25:
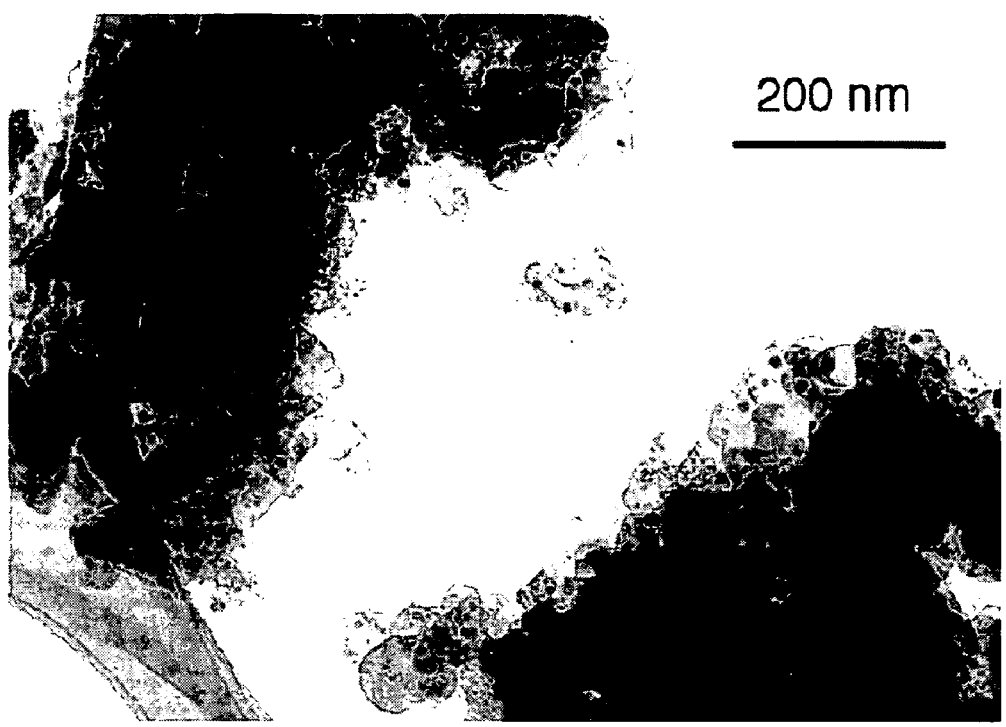
FIG. 25 illustrates a transmitting electron micrograph of pre-seeded condensed phase matrix material, representing an embodiment of the invention.

Referring to FIG. 25, a TEM image of pre-seeded condensed phase matrix material shows short, all less than 300 nm long, typically 100 nm long (e.g., less than 200 nm long) SWCNT seeds. It can be appreciated from FIG. 25 that most the aggregates do not have nanotubes. This can be termed a very low yield. The pre-seeded condensed phase matrix material shown in FIG. 25 was prepared in less than 1 second at 1000° C. inside a laser vaporization oven.

Figure 26:
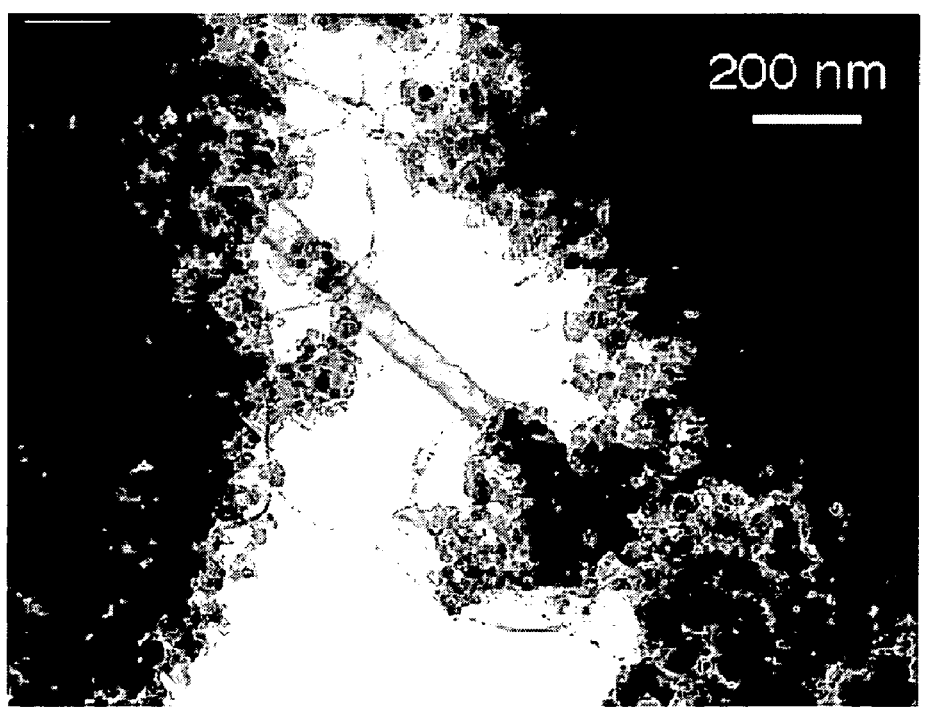
FIG. 26 illustrates a TEM image of a composite obtained by annealing the material shown in FIG. 25, representing an embodiment of the invention.

Referring to FIG. 26 a TEM image of the resultant composition after annealing the material shown in FIG. 25 at a temperature of greater than 1000° C. in 500 torr Argon for approximately 30 seconds in an environment external to the laser vaporization chamber in which the matrix material of FIG. 25 was prepared. It can be appreciated from FIG. 26 the SWCNT are much longer (e.g., 1 micron long SWCNT observed), the yield is much higher (e.g., almost every aggregate is coupled to SWCNT) and the bundles are thicker.

The implications of this are that a technique, such as laser ablation, plasma spray or many others, need only initiate SWNT growth during one processing step. The activated soot can then be stored for a period of time, for example, several days, shaped, manipulated in various ways, and then annealed to continue growth into longer SWNT. This discovery has applications for electronics as well as structural materials.

The invention can include any method by which nanotubes are placed in contact with carbon-containing material to continue or reinitiate growth into longer or additional nanotubes by annealing. The invention can include any method by which carbon nanotubes continue growth caused by ex situ annealing by thermal, laser, plasma or other technique. Annealing refers to heating by thermal processing treatments, intentional or inadvertent, subject to growth by contact between catalyst nanoparticles (liquid or solid) and carbonaceous material in solid (or liquid) form. The invention can include similar annealing of carbon materials without catalysts to form carbon nanotubes.

Figure 21:
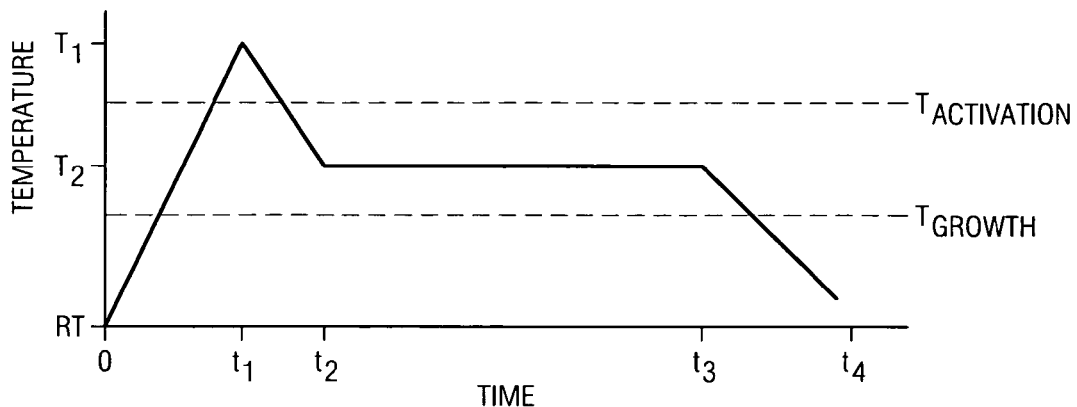
FIG. 21 illustrates a temperature time domain envelope for processes, representing embodiments of the invention.
Figure 22A:
FIGS. 22A-22G illustrate a variety of nanorods, representing embodiments of the invention.
Figure 22B:
Figure 22C:
Figure 22D:
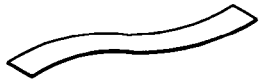
Figure 22E:
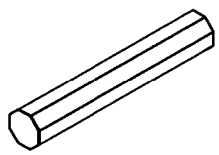
Figure 22F:
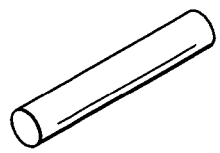
Figure 22G:
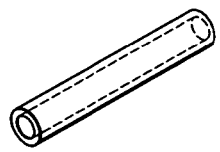

Referring to FIG. 21, a temperature of interest is the temperature of the material where the conversion is taking place. It is very difficult to measure this temperature in the center of the workpiece. A surface temperature may not be relevant to the temperature inside the bulk.

Energy can be applied in a manner to accomplish a temperature change over a period of time as specified in FIG. 21. The temperature is raised to a temperature T1, where T1 is greater than or equal to Tactivation (i.e., the temperature at which growth begins). This occurs within time t1. The temperature is maintained at a temperature T2, where T2 is greater than or equal to Tgrowth (the minimum temperature required to maintain growth). T2 may be less than, equal to, or greater than T1.

The porosity of the inventive compositions can be a signature of the invention. Since different nanotubes, single wall vs. various multiwalls, will have different pore sizes inside their hollow centers, we have devised a way to ignore this hollow volume, and define a close packed structure which is composed of these tubes and is tightly packed as possible as zero porosity, which corresponds to the maximum possible density for this tight-packed set of cylinders made from those type of tubes.

Taking hollow cylinders (all of a particular diameter, number of graphitic shells comprising a particular wall thickness, spaced apart by a particular minimum distance, which for graphite is 3.4 Å) lying parallel to one another and packed as tightly as possible, this will achieve the maximum theoretical density for that particular type of nanotube. For this maximally packed structure, we define this as 100% theoretical packing density. This packing density does not include a consideration of microporosity (e.g., the volume not occupied by material inside a nanotube, either single wall or multi-wall. The invention can include packing densities greater than approximately 10%, 20%, 30%, 40%, 50%, 60%, 70%, 80%, or 90% of the theoretical packing density.

The invention can include a plurality of nanorods that are at least partially interwoven and/or interlocked. A fraction of the volume occupied by the nanotubes can have a substantially random distribution of orientations. Specifically, the distribution of the spatial orientations of an ensemble of the nanorods to an arbitrary fixed set of three-dimensional axes can be substantially random.

The invention can include a plurality of nanorods in which a substantially random interweaving and/or interlocking structure is defined by the substantially random distribution of intersection angles with other nanotubes. The invention can include the combination of packing density and the presence of interlocking or interwoven structure.

Figure 23:
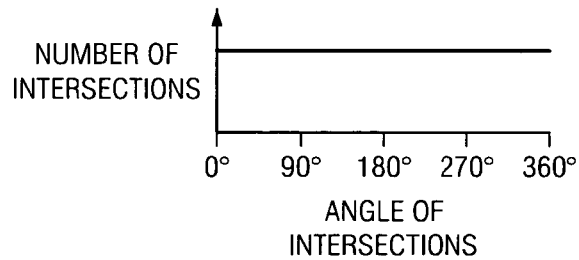
FIG. 23 illustrates the number of nanorod intersections as a function of the angle of intersection for nanorods that composed a composition, representing an embodiment of the invention.

The intersection angles of nanorods in the inventive compositions can be a signature of the invention. Referring to FIG. 23, the invention can include the substantially random distribution of intersection angles between the nanorods. While FIG. 23 depicts are substantially random distribution within the range of all angles, the invention can include compositions in which the defined intersection angles are substantially random within a narrower range of angles. The invention can include random angle intersections within the range of from 0 to 30, 60, 90, 120, 150, 180, 210, 240, 270, 300, 330 or 360 degrees. In contrast, in an aligned-CVD material (which is dense), the material tends to form parallel to each other after some time; resulting in a sharply-peaked distribution of intersection angles around 0°.

The invention can include a composite comprising a plurality of nanorods that i) define a local volume and ii) are at least partially interwoven to define a fraction of said volume, said plurality of nanorods within at least said fraction interrelated to define (a) a substantially random distribution of intersection angles between said plurality of nanorods and (b) a localized packing density greater than 50% of a theoretical maximum packing density, which does not account for any voids within said plurality of nanorods. Thus, the invention can be embodied in a foam where most of the macrovolume is void (pore) and the local volume represents the solid walls of the foam.

For instance, consider a cubic micron through which 100 nanotubes pass. The nanotubes all enter one side of the cube and passes out through an opposite side of the cube. The local volume is the space within the cube that is occupied by the nanotubes. Only near the center of the cube, the nanotubes are interwoven and/or interlocked to define the conditions (a) and (b) above. The fraction of the local volume is that portion of the local volume where the conditions (a) and (b) are met. It can be appreciated that in another example, the fraction could be ⅓ (i.e., the entire local volume satisfies the conditions (a) and (b). It can also be appreciated that in yet another example, the local volume could occupy substantially all of the entire cubic micron of space (i.e., nanorods are tightly packed together throughout the cubic micron, albeit not necessarily in an interwoven or interlocked condition, except within that portion of the nanorods that define the fraction, which could be very small).

The term approximately, as used herein, is defined as at least close to a given value (e.g., preferably within 10% of, more preferably within 1% of, and most preferably within 0.1% of). The term substantially, as used herein, is defined as at least approaching a given state (e.g., preferably within 10% of, more preferably within 1% of, and most preferably within 0.1% of).

The invention can include a composite structure. The invention and any corresponding composite has no minimum dimension. This is especially important for applications as skins or sheets or coatings.

The invention can include any as-grown nanotube composite which has a dimension greater than 1 millimeter. It should be noted that loose tubes can be compressed after growth, and made to look like an as-grown material, but will not be strong.

EXAMPLES

Specific embodiments of the invention will now be further described by the following, nonlimiting examples which will serve to illustrate in some detail various features of significance. The examples are intended merely to facilitate an understanding of ways in which the invention may be practiced and to further enable those of skill in the art to practice the invention. Accordingly, the examples should not be construed as limiting the scope of the invention.

Example 1

In this example, the synthesis of single-wall carbon nanotubes by Nd:YAG laser vaporization of a graphite/(Ni, Co) target was investigated by laser-induced luminescence imaging and spectroscopy of Co atoms, $C_2$ and $C_3$ molecules, and clusters at 1000° C. in flowing 500 Torr Ar. These first laser induced emission images under typical synthesis conditions show that the plume of vaporized material is segregated and confined within a vortex ring which maintains a approximately 1 cm$^3$ volume for several seconds. Using time-resolved spectroscopy and spectroscopic imaging, the time for conversion of atomic and molecular species to clusters was measured for both carbon (200 µs) and cobalt (2 ms). This rapid conversion of carbon to nanoparticles, combined with transmission electron microscopy analysis of the collected deposits, indicate that nanotube growth occurs over several seconds in a plume of mixed nanoparticles. By adjusting the time spent by the plume within the high-temperature zone using these in situ diagnostics, single-walled nanotubes of controlled length were grown at an estimated rate of 0.2 µm/s.

Recently laser induced luminescence (LIL), gated intensified charge-coupled device (ICCD), imaging, and optical emission spectroscopy were applied to understand how nanoparticles form and grow in pulsed laser ablation plumes at room temperature.

In this Example these techniques are applied to understand how SWNT grow from laser-vaporized carbon and catalyst species under typical growth conditions at high temperatures.

FIGS. 6A-6C depict a schematic of a 2"-diameter quartz-tube 100 and a furnace 110 used for laser vaporization growth of SWNT with in situ LIL-imaging and spectroscopy diagnostics. Beam geometries and imaginable area are indicated. The black dots and the numbers in FIG. 6A show the collection points of the ablated material: 1-upstream; 2-collector. A C/Ni/Co target 130 was positioned at two distances, d, from the front of the furnace 110. FIG. 6B shows the relative timing between ablation (Nd:YAG) and LIL-probe (XeCl) laser pulses (Δt), and the ICCD gate delay after the XeCl laser, (Δτ).

The SWNT growth apparatus shown in FIGS. 6A-6C was assembled. The growth apparatus includes a quartz tube 100 (2 in. diameter, 24 in., length) mounted inside a hinged tube furnace 110 (12 in. length) operating at 1000° C. The quartz tube 100 was O-ring sealed to standard 4.5-in.-Conflat vacuum components (not shown) laser ablation and probe laser beams entered through a Suprasil window (not shown) which was mounted on a vacuum flange (not shown). Argon gas (indicated by two parallel arrows pointing to the right) was introduced around this window, controlled at 100 sccm to maintain a 500 Torr pressure, and pumped out through a needle valve (not shown) that was located downstream of a brass water-cooled collector 120 which was inserted into the quart tube 100 as shown.

Referring to FIG. 6A, the 1-in. diameter graphite target 130 containing 1 at. % each of Ni (Alfa, 2.2-3.0 um, 99.9%) and Co (Alfa, 1-6 um, 99.8%) powders was prepared with carbon cement (Dylon GC). The target 130 was screwed onto a 0.25-in. diameter graphite rod 140 and was rotated during operation. This rod 140 was mounted along the tube axis through a hole in the collector 120. The ablation laser beam (pulsed Nd:YAG, 8-ns FWHM, both 1.06 um fundamental and 532 nm 2nd harmonic, total energy approximately 140 mJ) was focused to a 1.6 mm-diameter donut-shaped spot on the target 130. An unfocused, time-delayed XeCl-laser pulse (308 nm. 30 ns FWHM, 20 mJ/cm$^2$) was used to induce luminescence in the ablation plume.

The furnace 110 was opened for approximately 3 seconds to permit imaging of the plume with a gated ICCD-camera, system (Princeton Instruments, 5-ns minimum gate, 200-820 nm spectral range). Referring to FIG. 6B, a 100 nsec ICCD gate is depicted. At each plume location, the plasma emission and/or laser-induced luminescence was collected for optical emission spectroscopy using a 0.3-m spectrometer (Acton VM-503, resolution either 10 nm or 1.3 nm) with an intensified, gated diode array (Princeton Instrument IRY-70ORB). Referring to FIG. 6C, data acquisition is depicted with regard to the geometry of the setup.

Figure 7A:
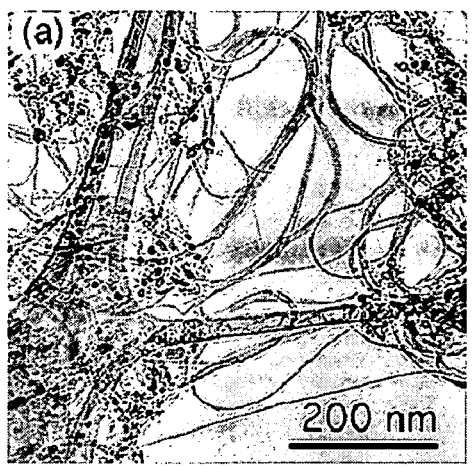
FIGS. 7A-7B illustrate transmitting electron micrographs of single-walled nanotube bundles and short single-walled nanotubes, respectively, representing embodiments of the invention.
Figure 7B:

FIGS. 7A-7B depict TEM images of the raw soot collected. FIG. 7A shows soot collected downstream on the collector (point 2, for d=21 cm in FIG. 6), showing a very high fraction of SWNT bundles along with metal nanoparticles (black dots); (b) upstream (point 1, for d–12.5 cm in FIG. 1) showing short (approximately 100 nm) SWNT in the early stages of growth, controlled by limiting the growth time to 0.5 s.

As shown in FIG. 7A, approximately 10 um-long SWNT bundles composed very high fractions of the deposits found downstream on the collector (>approximately 90% as estimated from field-emission SEEM analysis) when the target was positioned d=21 cm from the front of the furnace 110. Metal catalyst nanoparticles and very small amounts of amorphous carbon accounted for the rest of the deposit.

Figure 8A:
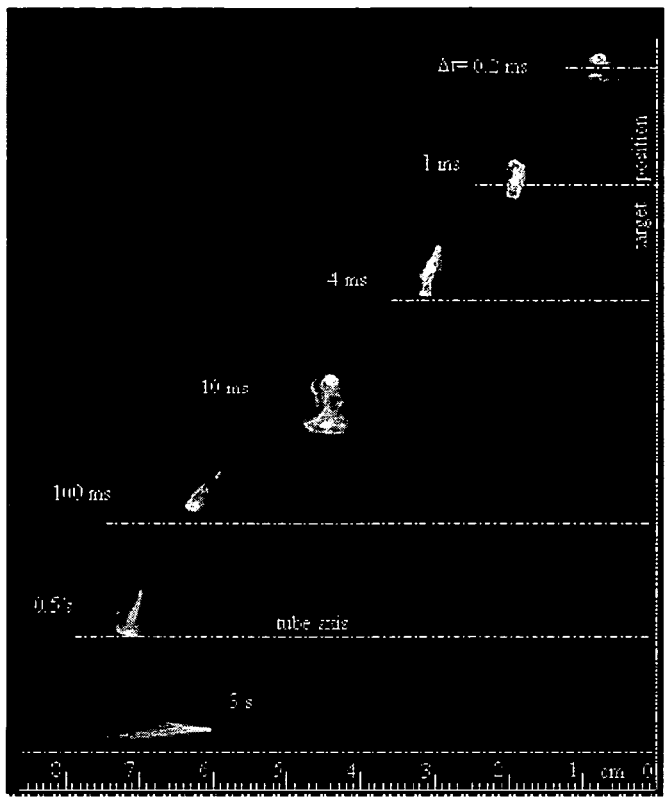
FIGS. 8A-8D illustrate results from a single-walled nanotube synthesis techniques, representing an embodiment of the invention.
Figure 8B:
Figure 8C:
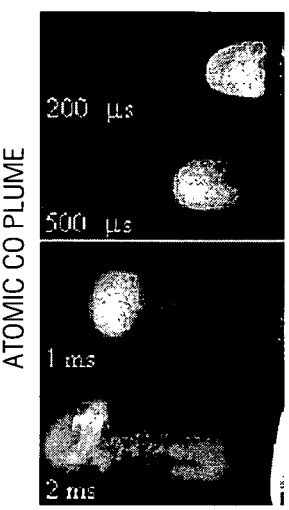
Figure 8D:
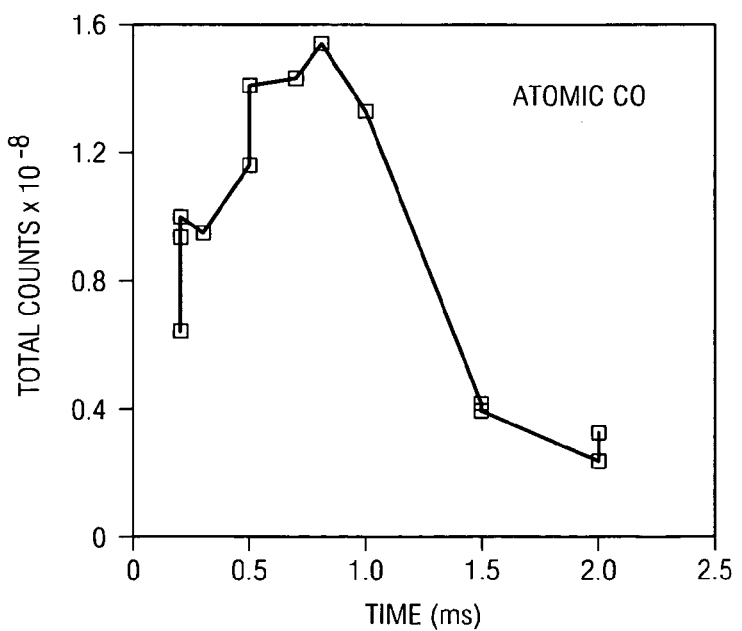

FIGS. 8A-8B depict laser-induced luminescence (LIL) images of C/Ni/Co plume during SWNT synthesis. Nd:YAG-laser vaporizes a C/Ni/Co target (right edge of FIG. 8A) inside a 2-in. quartz tube at 1000° C. 500 Torr Ar (flowing to the right at 100 sccm). Each image represents a different ablation event. Unfiltered images show the location of C/Ni/Co species during nanotube growth (100 ns gate wide opened Δτ=100 ns after the XeCl-laser pulse). FIG. 8B depicts selective imaging in the 320-380 nm spectral region to locate ground-state atomic Co in the plume (100 ns gate width, Δτ=0). FIG. 8C shows temporal history of total number density of ground-state atomic Co, determined from integrating the LIL from a complete set of atomic-Co images of the type shown in FIG. 8B.

To understand where and when growth occurred, LEL-ICCD imaging and spectroscopy of the C/Ni/Co plume were performed at different times after laser vaporization, delta t, spanning 20 ns<delta t<30 ns. For delta t<0.2 ms, a series of shocks within the plume results in segregation of the ablated material into the vortex ring (or "smoke ring") shown at delta t=0.2 ms in FIGS. 8A and 8B. This vortex ring is generated because of the viscous interaction between the plume and the background gas, promoting clustering of plume species through three-body collisions. As shown in FIG. 8A, the vortex motion efficiently traps aggregated nanoparticles in a confined volume for long times (approximately 3 sec within approximately 1 cm² in this example).

The leading edge of the plume propagates with velocities of: approximately $10^3$ cm/s between 200 μs<Δt<2 ms; 50 cm/s for 10 ms<Δt<50 ms; and 6 cm/s at 30 ms<Δt<200 ms. After Δt=2 s the plume stops moving upstream and the plane of the vortex ring tilts toward the tube axis, possibly due to flow currents or thermophoretic forces. The plume is then dragged by the gas flow back to the collector with an estimated flow velocity of 0.6 cm/s. Finally, nanotubes and unconverted soot deposit on the cool collector 120 surface by thermophoresis. A detailed comparison between the plume dynamics at room temperature and at 1000° C. is described in the following example.

FIGS. 9A-9D depict plasma emission (dashed) and laser-induced luminescence (solid) spectra measured at different time delays after the ablation laser pulse, Δt, and distances, x, from the target: FIG. 9A depicts Δt=20 μs, x=_cm. FIG. 9B depicts Δt=100 μs, x=0.5 cm. FIG. 9C depicts Δt=1 ms, x=2 cm and FIG. 9D depicts Δt=20 ms, x=5 cm. Acquisition times of 100 ns (FIGS. 9A-9B) and 3.5 μs (FIGS. 9C and 9D) began 50 ns after the XeCl-laser pulse. The inset in FIG. 9C shows a 1.3-nm resolution spectrum of induced fluorescence from the following transitions: (1) $b^4F_{7/2}$-$y^2G^0_{9/2}$ at 341.23 nm (2) $b^4F_{9/2}$-$y^4G^0_{11/2}$ at 345.35 nm (3) $b^4F_{5/2}$-$y^4G^0_{7/2}$ at 350.98 nm (4) $b^4F_{7/2}$-$y^4G^0_{9/2}$ at 352.98 nm and (5) $b^4F_{5/2}$-$y^4D^0_{5/2}$ at 357.50 nm.

FIGS. 9A-9D present a short summary of the optical emission spectra corresponding to the images. At early times in the plume expansion, emission from excited states in the plasma dominates any laser-induced luminescence. As in FIG. 9A, the $d^3\Pi_g \rightarrow a^3\Pi_u$ Swan system of $C_2$, and the $A_1\Pi_u \rightarrow X^1\Sigma_g$ band of $C_3$ are prominent at these times. Later when the plasma expands, cools, and recombines, the 308 nm-XeCl laser can induce emission by pumping transitions from the ground states: of $C_3$, (via $A^1\Pi_u \leftarrow X^1\Sigma_g$); of atomic Co (via $a^4F_j \leftarrow y^4G^o_j$); and of atomic Ni (via $a^3D_1 \leftarrow y^3D^o_2$).

In addition, blackbody radiation can be induced from carbon clusters, nanoparticles, and nanotubes. The intensity of this blackbody emission, I, is defined by $I=Ar^3(T_o+\Delta T)$ where $T_o$ is the initial temperature of the cluster, ΔT is the temperature increase due to laser-heating, A is a constant and r is the cluster radius. This radiation becomes observable coincident with the disappearance of the C and $C_3$, bands in both the plasma-emission and the laser-induced spectra for Δt>200 μs at 1000° C. (and Δt>100 μp at room temperature). We conclude that substantially all of the carbon in the plume has converted into clusters or larger aggregates by these times.

However, the atomic Co in the plume remains in atomic form until much later times. As shown in FIGS. 8C and 9C, the ground-state Co population peaks at Δt=0.8 ms and drops by an order magnitude by Δt=2 ms, permitting estimates of the Co clustering time of approximately 2 ms at 1000° C. (approximately 1 ms room temperature). Blackbody radiation remains the only feature of the spectra taken at later times (see FIG. 9D).

Further evidence of the sequential condensation of carbon and cobalt into clusters is the relative uniform spatial distribution of atomic-Co in the plume for Δt<2 ms compared to the vorticity of clustered carbon material (compare FIGS. 8(a), (b) and 3(b) and (c)). We believe that the higher diffusivity of the atomic Co effectively competes with the hydrodynamic trapping during this time. Only the leading edge of the atomic-Co plume overlaps the carbon clusters during the condensation of the Co atoms. Assuming that Co clustering initiates nanotube formation, it appears that nanotubes grow from mixed nanoparticles over seconds of time.

In order to check this assumption and estimate the growth rate, the target was positioned closer to the front furnace edge (d=12.5 cm in FIG. 6) such that the plume spent only approximately 0.5 s within the hot zone before exiting the furnace in the upstream direction. LIL-ICCD imaging recorded the plume dynamics from ablation to deposition. For Δt<100 ms the propagation dynamics are very similar to those shown in FIG. 8. However, for Δt>100 ms the plume propagation changes dramatically, i.e. the plane or the ring vortex tilts relative to the tube axis and the ring elongates along this axis. Between 0.5-0.7 sec the plume exits the furnace in this tilted orientation to deposit onto the upper surface of the quartz tube (at point 1 in FIG. 6).

A transmission electron microscopy (TEM) image of this deposit is shown in FIG. 7B. The collected material consists of aggregated carbon and metal-catalyst nanoparticles, and thin SWNT bundles of only approximately 100 nm length. The relative yield of the carbon particles is larger than the yield of the carbon nanotubes which clearly shows that the time spent by the plume in the hot zone (approximately 0.5 s) was not sufficient to convert all of the carbon material into nanotubes. The average growth rate at 100° C. estimated at approximately 0.2 μm/s.

To summarize this example, we have used laser-induced imaging and spectroscopy diagnostic techniques, along with ex situ TEM, to determine that single-walled carbon nanotubes form over several seconds in the hot furnace after laser vaporization. Size-controlled SWNT were formed in short 100-nm lengths controlling the growth time with these diagnostics to approximately 0.5 s, yielding 0.2 μm/s for the first estimate the LV-growth rate. The spectroscopy at early times after laser ablation indicates that the plume initially consists of atomic and molecular species, with no evidence of hot molten particulates which was recently suggested as the primary ejecta. Condensation of carbon occurs within 0.2 ms after ablation while atomic Co condenses much later (between 1.5 and 2 ms). The nanotubes grow within a ring which trap clusters and aggregates within a approximately 1 cm³ volume during very long period of time (approximately 3 s). Assuming that metal catalyst clusters are required before carbon nanotube growth begins, we conclude that feedstock for nanotube growth is this mixture of carbon and metal catalyst nanoparticles. It is quite possible that the carbon clusters serve as the condensation centers for the metal clusters, and mixed carbon-catalyst alloy clusters are produced. Finally, we produced high-purity SWNT deposits with laser repetition rates as low as 0.016 Hz. Through these images of the growth process, we conclude that long (approximately 10

μm) SWNT can form from the small amount of material vaporized in a single-laser shot, a remarkable feat of self-assembly.

Example 2

In this example, the key spatial and temporal scales for single-wall carbon nanotube (SWNT) synthesis by laser vaporization at high temperatures are investigated with laser-induced luminescence imaging and spectroscopy. Again using the setup depicted in FIG. 6, graphite/(Ni.Co) targets are ablated under typical synthesis conditions with a Nd:YAG laser at 1000° C. in a 2-in. quartz tube reactor in flowing 500 Torr Ar. The plume of ejected material is followed for several seconds after ablation using combined imaging and spectroscopy of Co atoms, $C_2$ and $C_3$ molecules, and clusters. The ablation plume expands in stages during the first 200 μs after ablation and displays a self-focusing behavior. Interaction of the plume with the background gas forms a vortex ring which segregates and confines the vaporized material within a approximately 1 cm$^3$ volume for several seconds. Using time-resolved spectroscopy and spectroscopic imaging, the time for conversion of atomic and molecular species to clusters was measured for both carbon (200 μs) and cobalt (2 ms) at 1000° C. This rapid conversion of carbon to nanoparticles, combined with transmission electron microscopy analysis of the collected deposits, indicate that nanotube growth occurs over several seconds in a plume of mixed nanoparticles. By adjusting the time spent by the plume within the high-temperature zone using these in situ diagnostics, single-walled nanotubes of controlled (approximately 100 nm) length were grown and the first estimate of a growth rate on single laser shots (0.2 μm/s) was obtained.

Carbon nanotubes were synthesized under a variety of laser repetition rates, flow conditions, target positions, and numbers of total shots on the target using the setup shown in FIG. 6. Following each run, deposits were collected at various points in the reactor and analyzed by bright-field TEM for correlation with the transport dynamics observed during the run with time-resolved imaging and/or spectroscopy. When the target was positioned d=21 cm from the front of the furnace, approximately 10 μm-long SWNT bundles comprised very high fractions of the deposit found downstream on the collector.

Figure 10A:
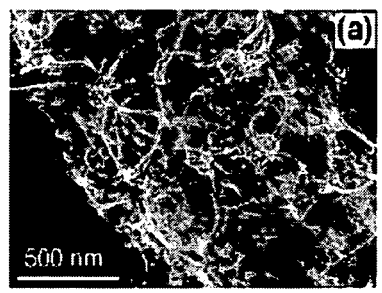
FIG. 10A illustrates a scanning electron micrograph image of single-walled nanotube bundles, metal catalyst particles, and unconverted carbon soot, representing an embodiment of the invention.
Figure 10B:
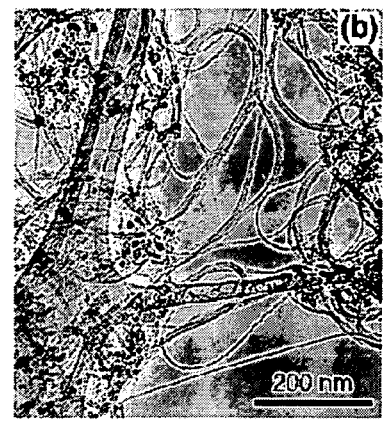
FIG. 10B illustrates a transmitting electron micrograph of single-walled nanotube bundles, representing an embodiment of the invention.

FIG. 10A depicts field-emission SEM image of SWNT bundles, metal catalyst particles, and unconverted carbon soot produced by laser ablation of a C/Ni/Co target at 1000° C. FIG. 10B depicts TEM images of the raw soot collected: downstream on the collector (point 2, for d=21 cm in FIG. 6), showing a very high fraction of SWNT bundles along with metal nanoparticles (black dots).

FIG. 10A shows a field-emission SEM image of a deposit produced at a laser repetition rate of only 0.016 Hz. Over 90% of the deposit appears to consist of SWNT bundles as estimated from an area analysis. Bright-field TEM images as in FIG. 10B show that metal catalyst nanoparticles and small amounts of amorphous carbon account for the rest of the deposit.

Figure 11A:
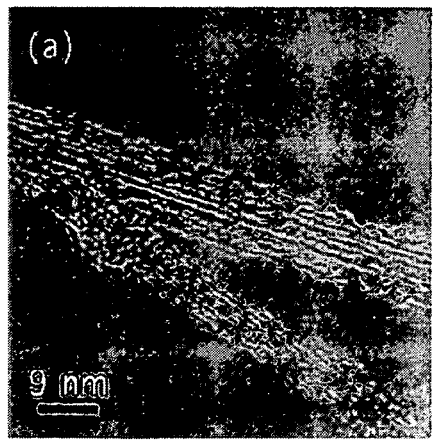
FIG. 11A illustrates a high resolution transmitting electron micrograph of bundles of single-walled nanotubes, representing an embodiment of the invention.
Figure 11B:
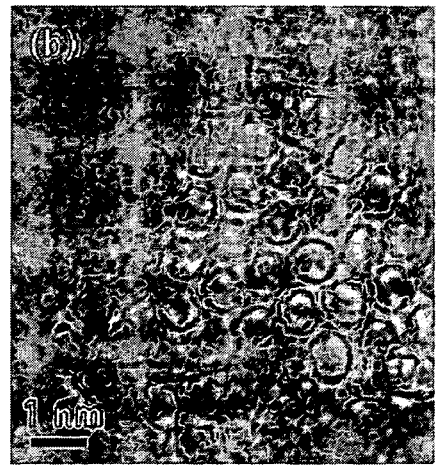
FIG. 11B illustrates a cross section of a nanotube bundle, representing an embodiment of the invention.

FIG. 11A depicts HRTEM images of bundles of SWNTs grown by laser ablation at 1000° C. FIG. 11B depicts a cross-section of a nanotube bundle, revealing the shape and diameters of the hollow SWNT.

High-resolution scanning TEM images such as those in FIG. 11A confirm that the bundles consist of SWNT. Cross-sectional images of the bundles permit an estimate of the nanotube diameters, as shown in FIG. 11B.

The ability to correlate these TEM and FESEM images of deposits with the plume transport dynamics (observed with in situ diagnostics, described below) permits conclusive assessment of the growth conditions. For example, the laser repetition rate for the results shown in FIGS. 11A-11B was chosen to ensure that the plume observed by imaging had completely cleared the growth chamber, so that the long nanotubes in FIGS. 11A-11B reflected SWNT created on single laser shots.

Plume Dynamics

To understand where and when nanotubes grow, ICCD imaging and spectroscopy of the C/Ni/Co plume were performed at different times after laser vaporization, Δt, spanning 20 ns<Δt<3s. At early times, the ablated material is primarily in excited states and can be imaged directly from the plasma emission alone (without LIL excitation).

Figure 12:
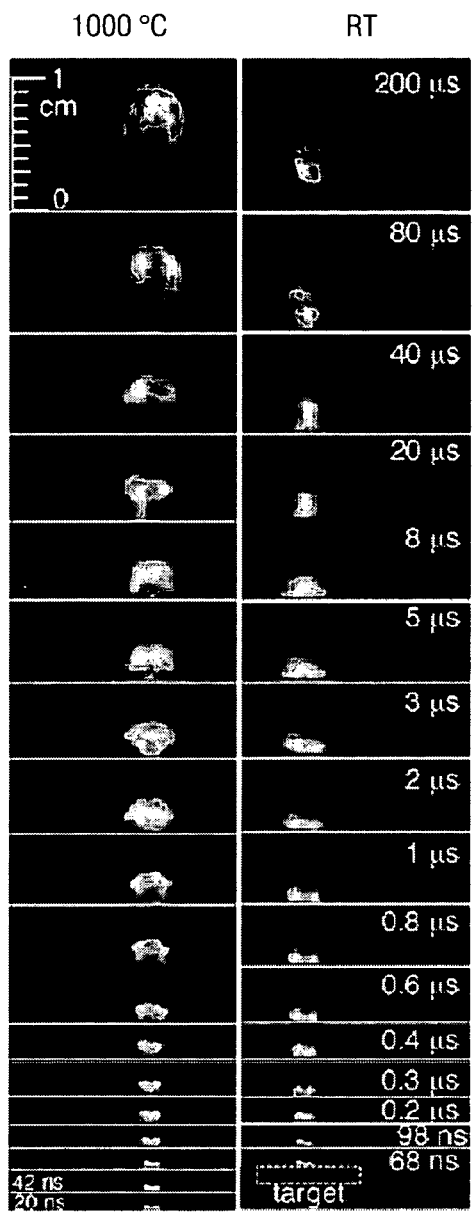
FIG. 12 illustrates images of nascent plasma emission from the plume of a vaporized carbon/nickel/cobalt target material for various times at both 1000° C. and at room temperature, representing embodiments of the invention.

FIG. 12 depicts ICCD-images of the nascent plasma emission from the plume of vaporized C/Ni/Co target material at 1000° C. and at room temperature. The images show oscillations and self-focusing effects during the early dynamics of both plumes.

FIG. 12 compares the plume propagation at room temperature and at 1000° C. for Δt<200 μs. In each case, the plume exhibits oscillations in both axial and radial directions. Just after ablation, the plume expands both radically and axially and compresses the background gas. However, the initial kinetic energy of the plume contributes to its overexpansion into the background gas, and it expands past the position where the plume pressure is equals that of the surrounding ambient. Recovering from this overexpansion, a backward motion is inducted in the plume. In addition, a backward motion in the radial direction results in an axial focusing of the plume, as shown in FIG. 12.

Figure 13:
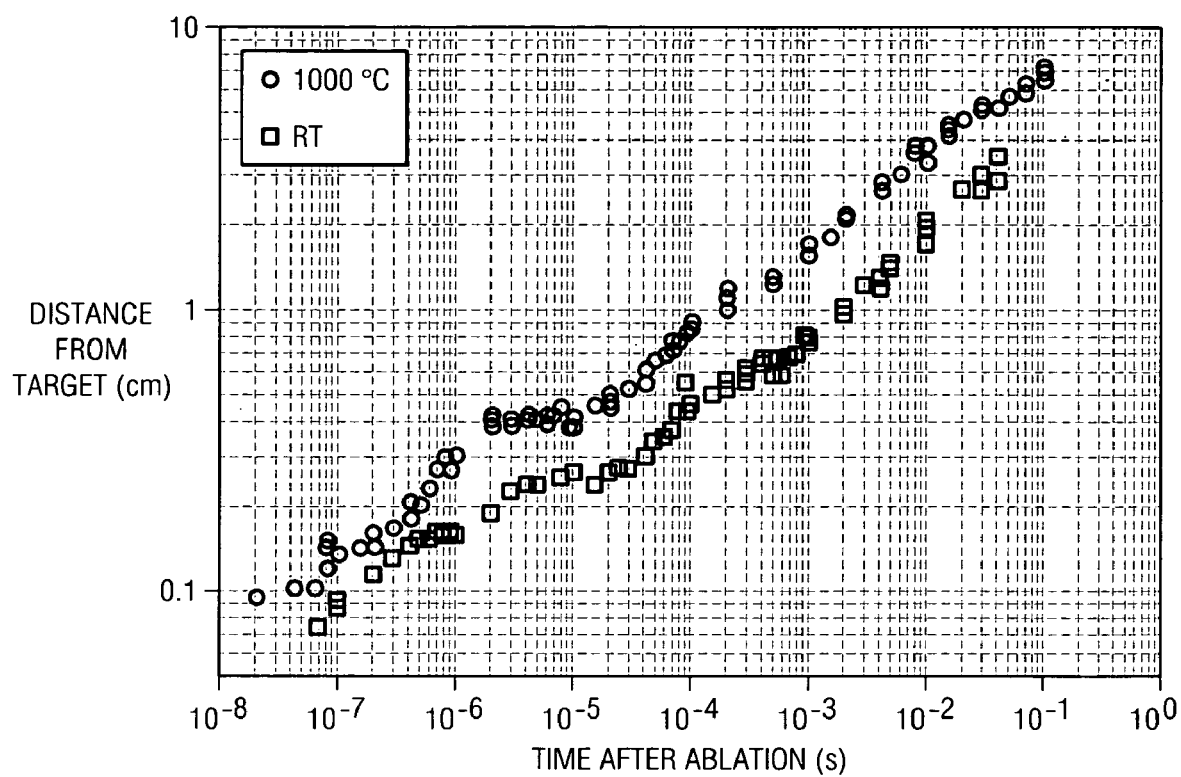
FIG. 13 illustrates distance from a target as a function of time after ablation for both 1000° C. and room temperature, representing embodiments of the invention.

FIG. 13 depicts propagation of the leading edge of the ablation plumes shown in FIG. 12. The position of the leading edge of the plasma plumes is plotted versus time in FIG. 13. At 1000° C., four axial oscillations, decaying in strength, are evident (at 40 ns, 200 ns, 2 μs, and 200 μs). At room temperature, three oscillations can be seen at 600 ns, 10 μs, and 300 μs. These oscillations result from the propagation of internal shock waves within the plume material, caused when the strong external shock wave is generated and detaches to propagate through the background gas. The plume material reflected from the contact surface between the plume and the background gas forms the internal shocks within the plume. These internal shocks serve to mix and additionally heat the atomic and molecular carbon and the catalyst species within the plume. This oscillatory behavior of laser plasmas propagating into background gases has been observed before, and has been described theoretically.

Figure 14A:
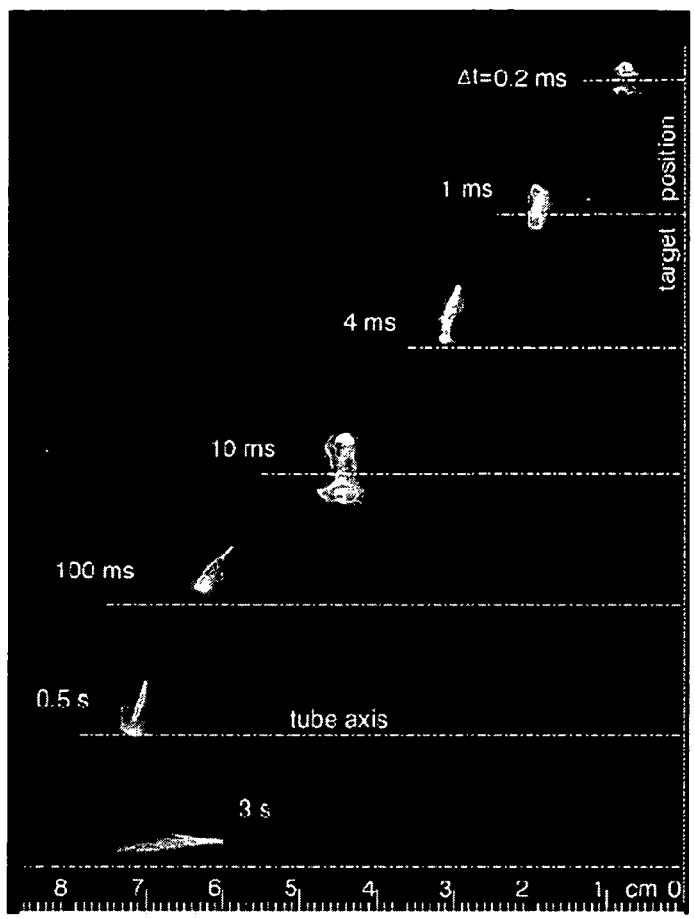
FIGS. 14A-14D illustrate results from a single-walled nanotube synthesis technique, representing an embodiment of the invention.
Figure 14B:
Figure 14C:
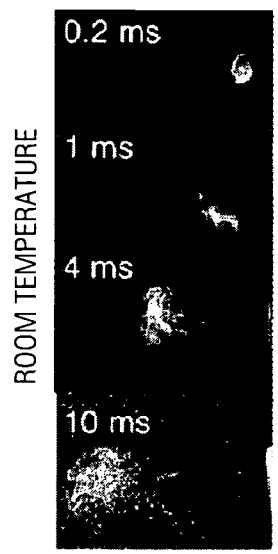
Figure 14D:
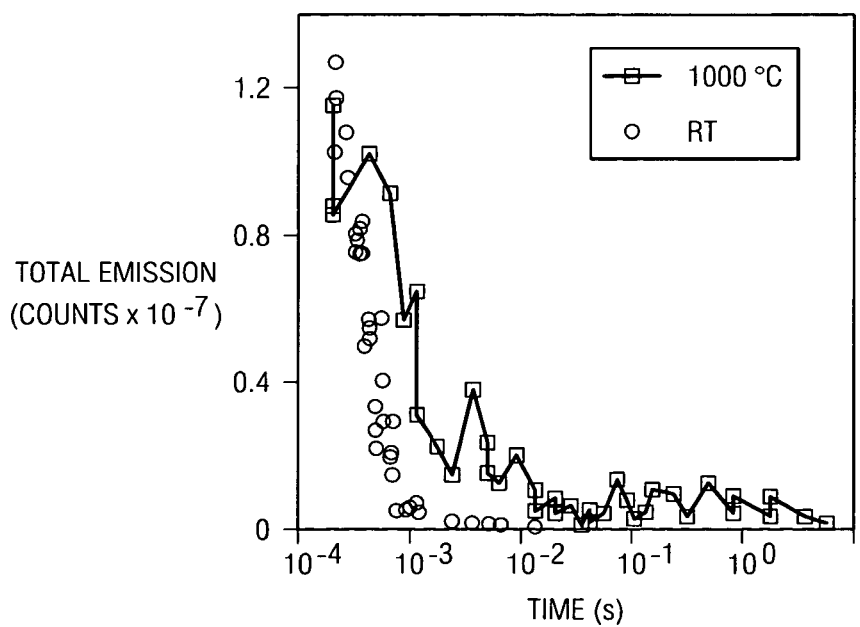

FIG. 14A depicts laser-induced luminescence (LIL) images record the dynamics of the C/Ni/Co plume during SWNT synthesis. A Nd:YAG-laser vaporized a C/Ni/Co target (right edge of figure) inside a 2-in. quartz tube at 1000° C. in 00 Torr Ar (flowing to the right at 100 sccm). Each image represents a different ablation event (100 ns gate width, opened Δτ=100 ns after the XeCl-laser pulse). FIG. 14B depicts an enlarged view (2×) of the plume at 0.2 ms showing vortex ring. FIG. 14C depicts LIL images at room temperature in 500 Torr Ar. FIG. 14D depicts integrated total emission from LIL-images acquired at the indicated times at 1000° C. and room temperature.

Following these plume oscillations during Δt<0.2 ms, the ablated material is segregated into a votex ring (or "smoke ring") shown at Δt=2.0 ms in FIGS. 14A-14B. This vortex ring is generated because of the viscous interaction between the plume and the background gas. Vortex formation efficiently mixes the ablated species with the background gas, promoting clustering of the plume species through three-body collisions. Then the vortex motion efficiently traps aggregated nanoparticles in a confined volume for long times (approximately 3 s within approximately 1 cm$^3$ in this study) as shown in FIG. 14A.

The leading edge of the plume in FIG. 14A propagates with velocities of: 10$^3$ cm/s between 200 μs<Δt<2 ms; 50 cm/s for 10 ms<Δt<5 ms; and 6 cm/s during 30 ms<Δt<200 ms. After Δt=2 s the plume stops moving upstream, and the plane of the vortex ring tilts toward the tube axis, possibly due to flow currents or thermophoretic forces. The plume is then dragged by the gas flow back to the collector with an estimated flow velocity of 0.6 cm/s. Finally, nanotubes and unconverted soot deposit on the cool collector surface by thermophoresis.

At room temperature the plume dynamics at later times are completely different. As shown in FIG. 14C, the plume propagates slower in the axial direction and the motion of the material within the plume is highly turbulent. This turbulent behavior can be seen more explicitly using Rayleigh scattering from the nanoparticles which form during the cooling of the laser plasma in the background gas.

Figure 15B:
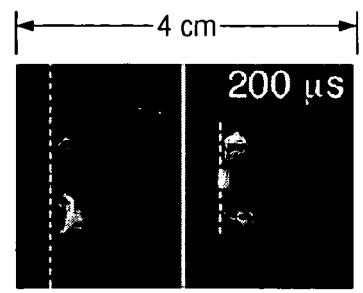
FIGS. 15A-15E illustrate images of Rayleigh scattered light and plasma emission from a carbon vapor plume generated by laser ablation, representing embodiments of the invention.
Figure 15C:
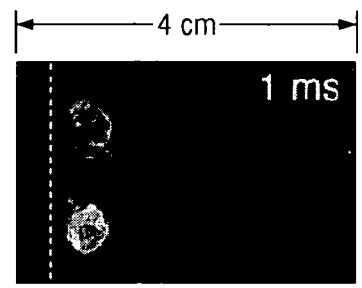
Figure 15D:
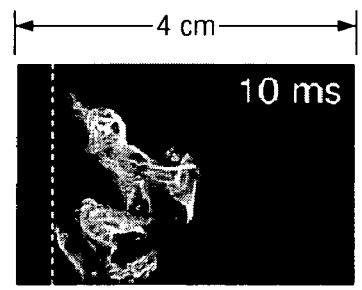
Figure 15A:
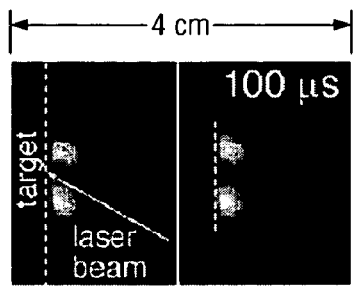
Figure 15E:
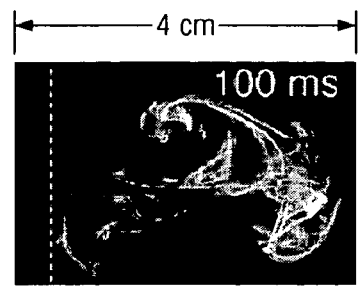

FIGS. 15A-15E depict images of Rayleigh-scattered (RS) light (308 nm XeCl-laser, 26 ns, 20 mJ/cm$^2$) and plasma emission from a carbon vapor plume generated by KrF-laser (248 nm, 28 ns FWHM, 7J/cm$^2$) ablation of a pyrolitic graphite target into 300 Torr Ar at room temperature. The onset of clustering can be gauged by comparing FIGS. 15A-15B RS (left) vs. Plasma emission images (right). FIGS. 15C-15E RS images at later times show the highly turbulent motion of plume material and its confinement within thin sheets.

Rayleigh-scattering images of the plume evolution from a pure graphite target after KrF-laser ablation into 300 Torr Ar, are shown in FIG. 15. By comparing images of the plasma with and without secondary laser-irradiation, the emergence of Rayleigh scattering can be used to estimate the onset of plume condensation into nanoparticles. Under these conditions, this time is estimated at 150 μs after ablation from these images. The nightly turbulent behavior evident in the images likely results from the higher background gases density and smaller gas viscosity compared to those at 100° C. Despite the plume expansion, the ablated material remains confined to a relatively small volume within the thin sheets of multiple vortices.

Plume Spectroscopy

Once the plume was located with ICCD-imaging, several spectroscopic techniques were applied to probe its composition, including: optical emission spectroscopy (OES) from excited states in the plasma; optical absorption spectroscopy (OAS) and laser-induced fluorescence (LIF) from ground-state atoms and molecules; laser-induced blackbody emission and Rayleigh scattering from clusters, nanoparticles, and nanotubes.

Figure 16A:
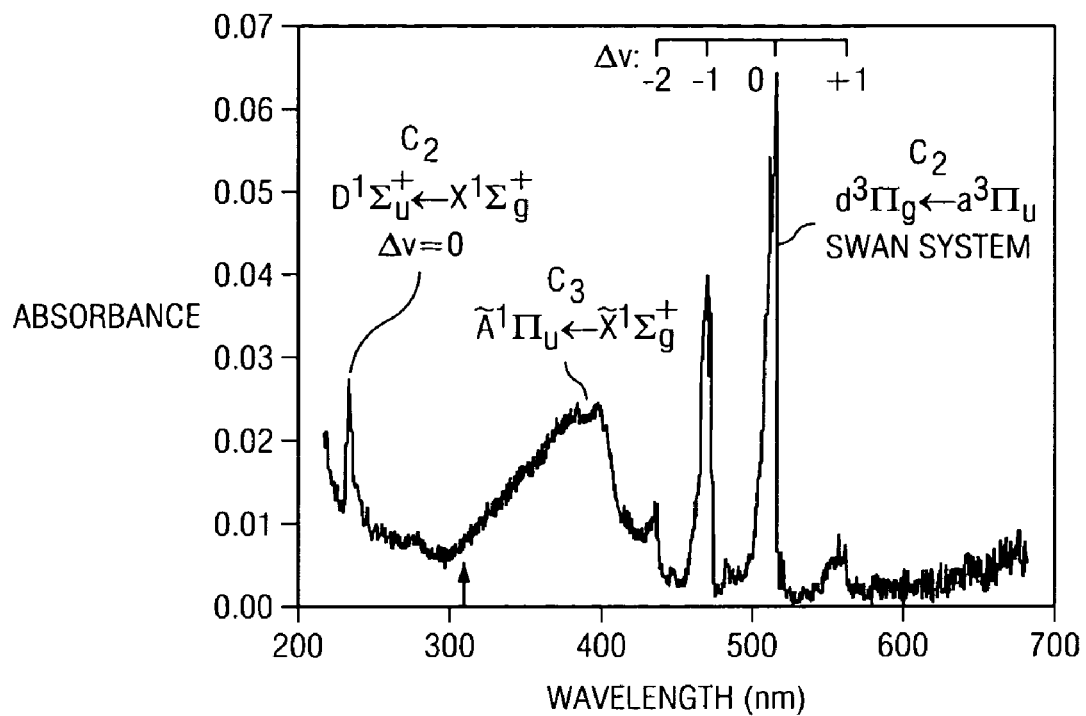
FIGS. 16A-16B illustrate results from a process, representing an embodiment of the invention.
Figure 16B:
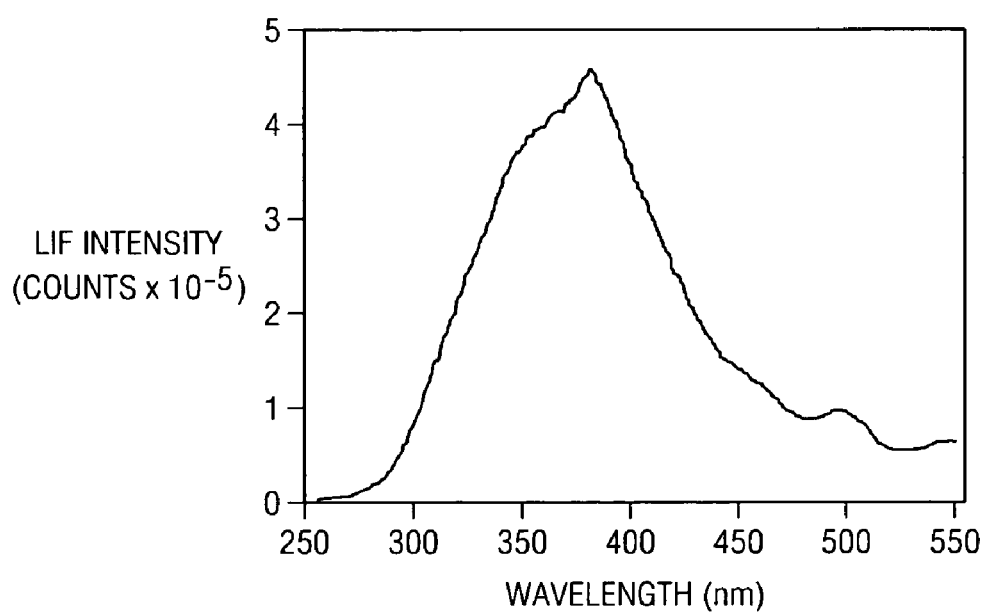
Figure 17A:
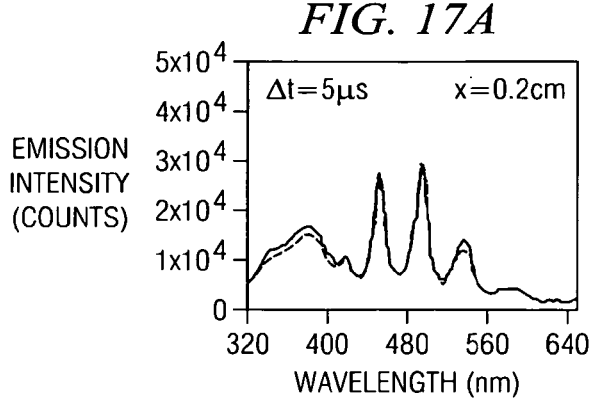
FIGS. 17A-17J illustrate plasma emission (lighter curve) and laser-induced luminescence (black curve) spectra measured at different time delays after a laser pulse, representing embodiments of the invention.
Figure 17B:
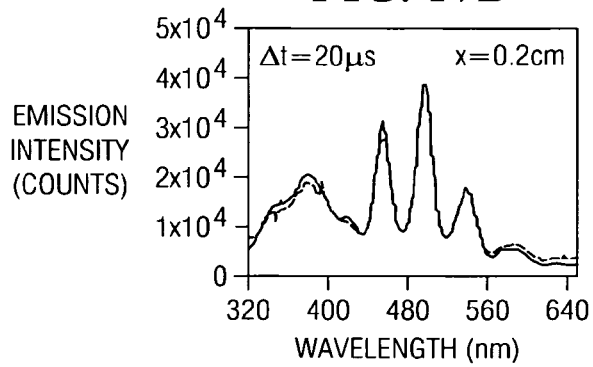
Figure 17C:
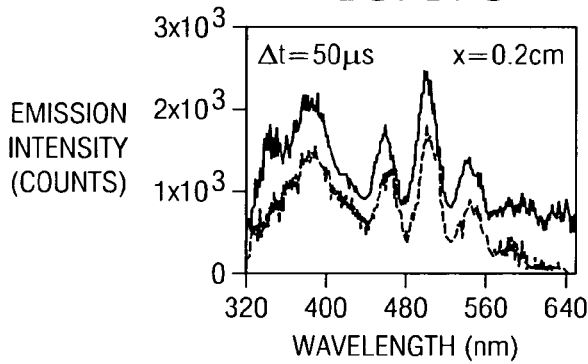
Figure 17D:
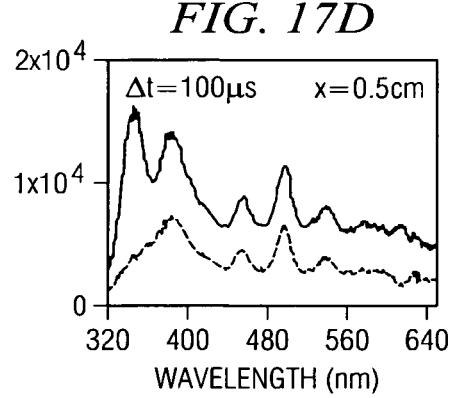
Figure 17E:
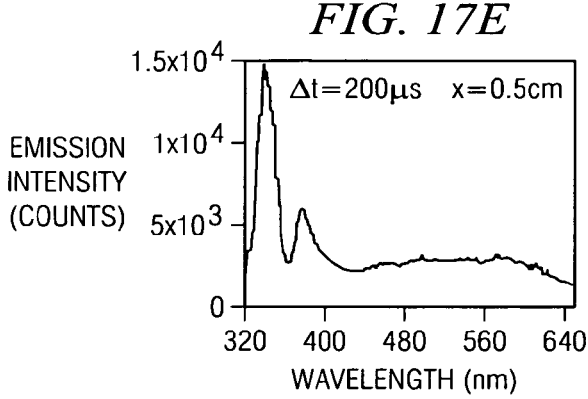
Figure 17F:
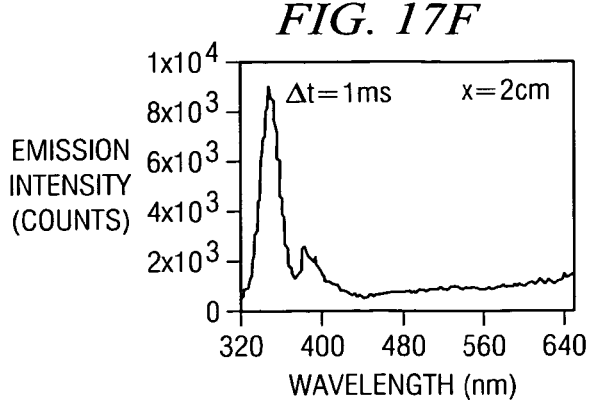
Figure 17G:
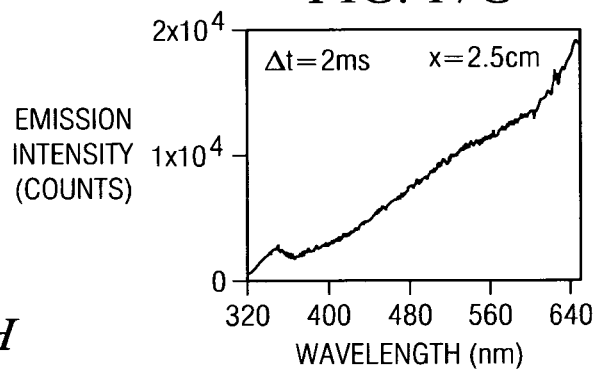
Figure 17H:
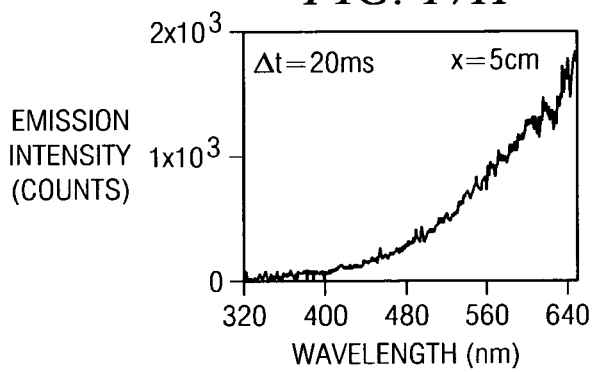
Figure 17I:
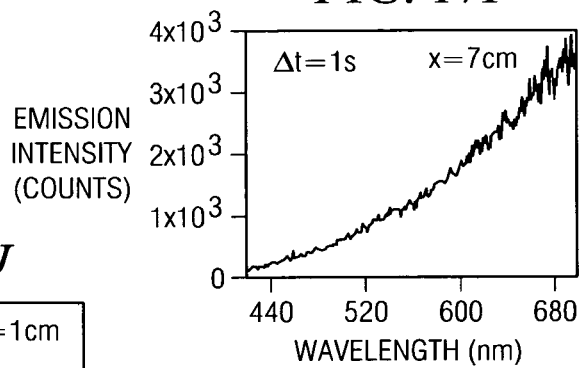
Figure 17J:
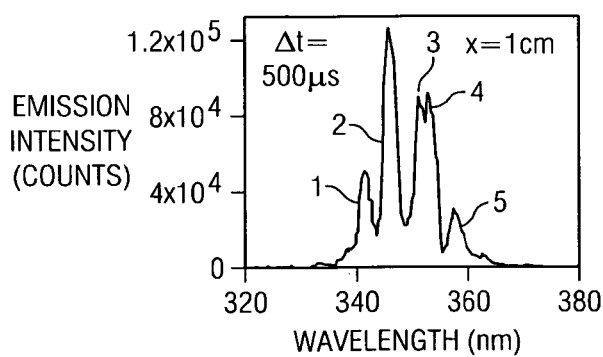
Figure 18A:
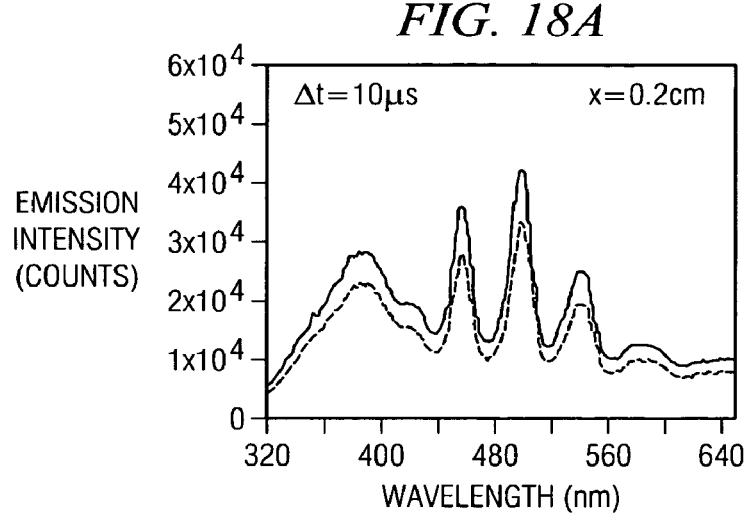
FIGS. 18A-18H illustrate plasma emission (lighter curve) and laser-induced luminescence (black curve) spectra measured at different time delays after an ablation laser pulse, representing embodiments of the invention.
Figure 18B:
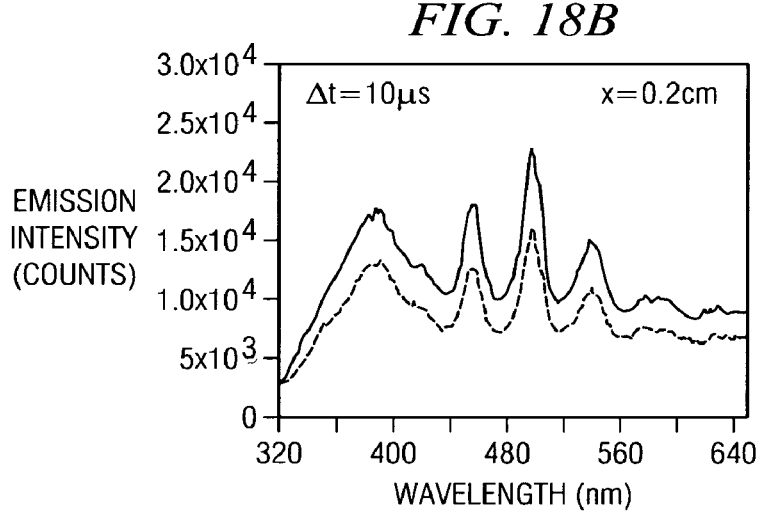
Figure 18C:
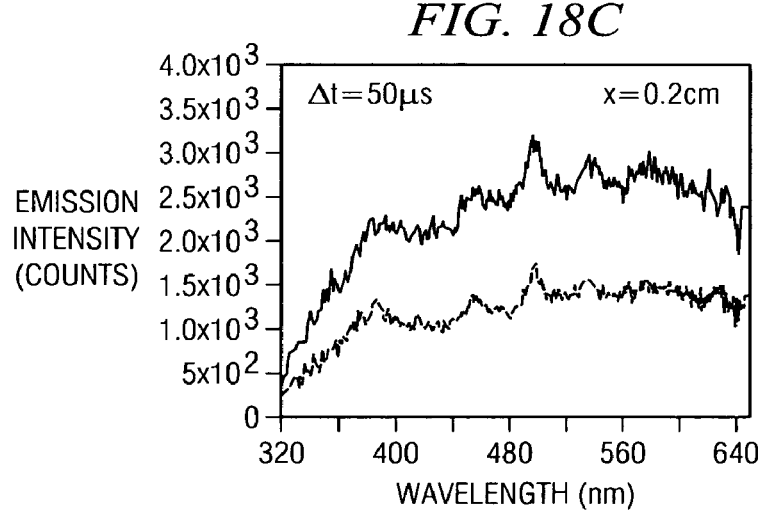
Figure 18D:
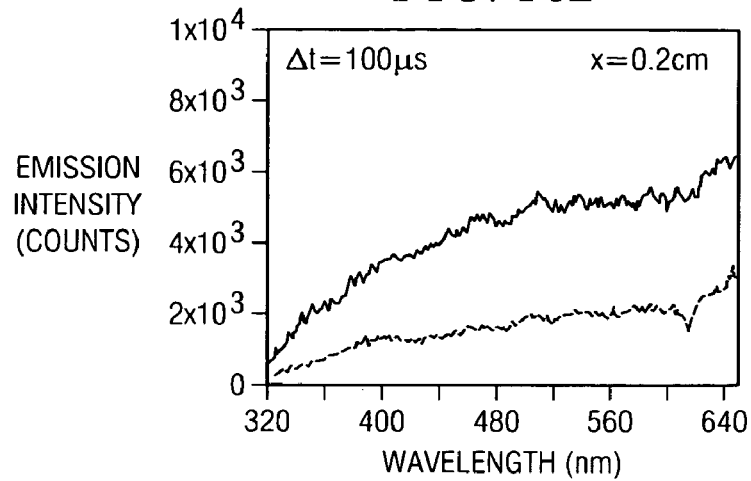
Figure 18E:
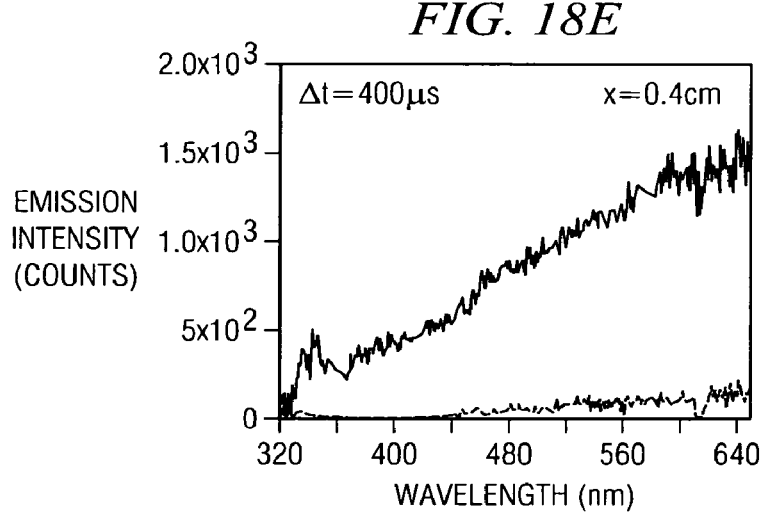
Figure 18F:
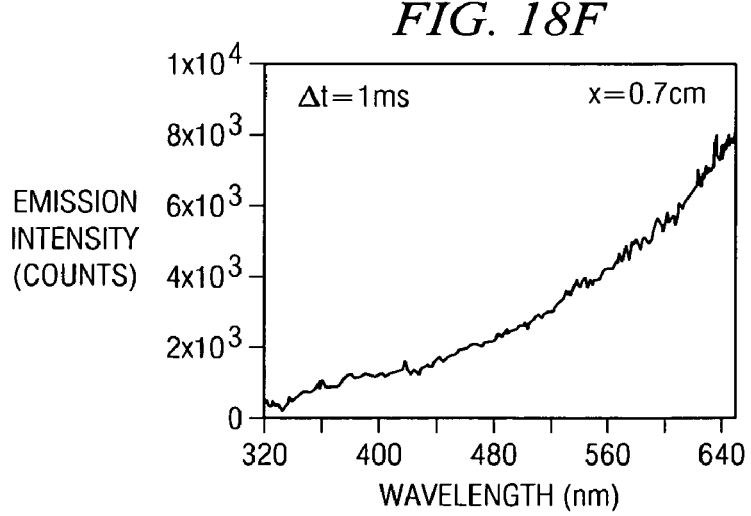
Figure 18G:
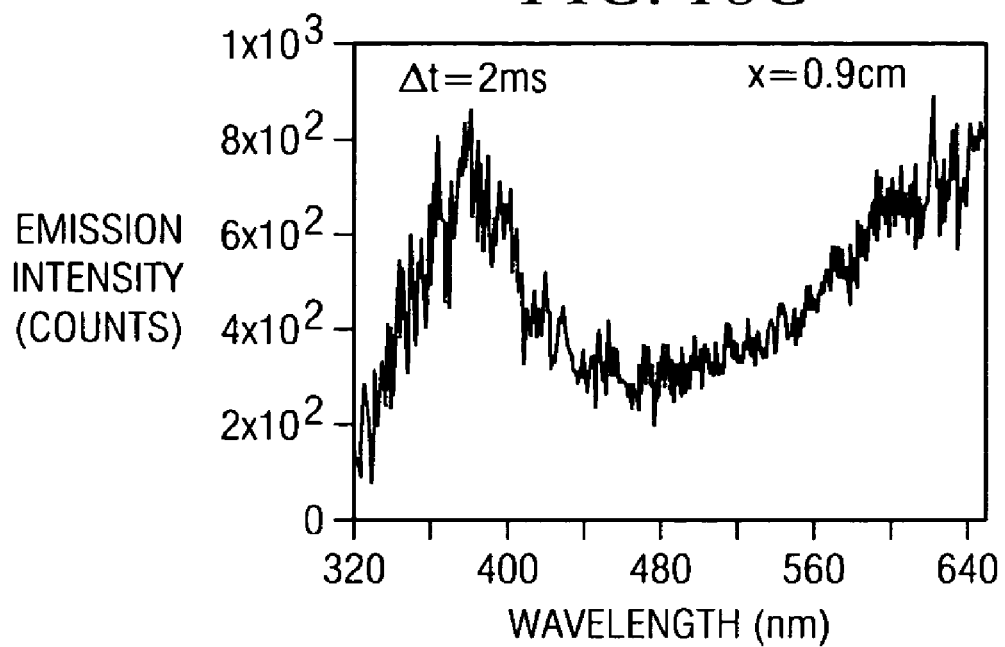
Figure 18H:
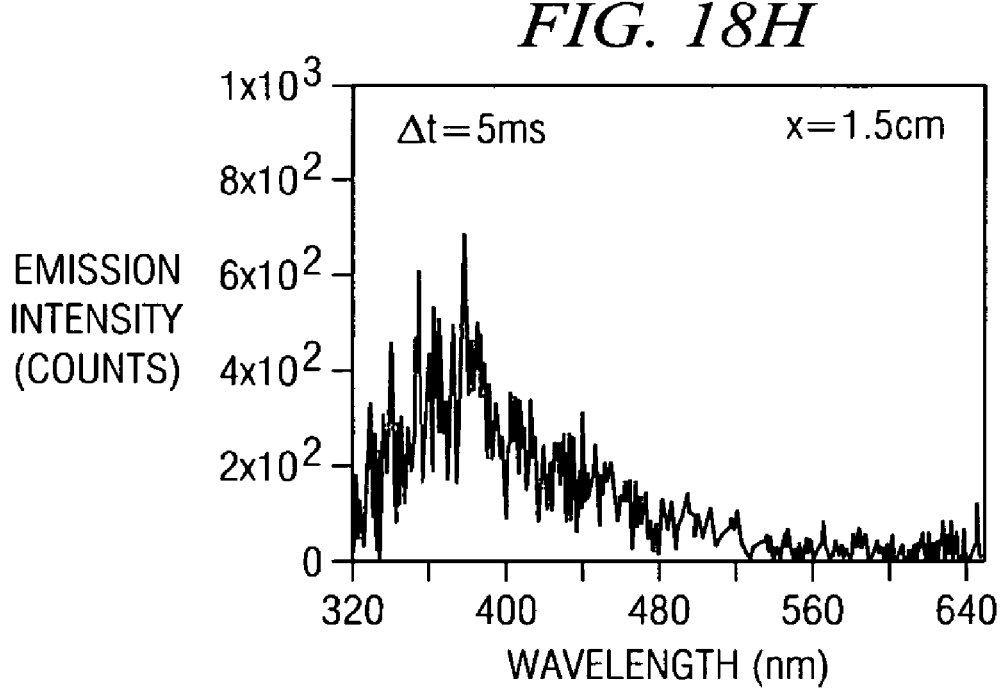

FIG. 16A depicts gas-phase absorption spectrum of the carbon vapor plume generated by KrF laser (1.6 J/cm$^2$) ablation of a pyrolitic graphite target into vacuum. The spectrum was acquired d=0.5 cm from the target surface, with a 400 ns gate width beginning 1 μs after the KrF-laser pulse. FIG. 16B depicts LIF (XeCl-laser, 20 mJ/cm$^2$)-spectrum of $C_3$ in the carbon vapor plume generated by KrF-laser in vacuum.

To understand the nature of the carbon species ejected from the target, OAS was performed in vacuum. FIG. 16A shows a low-resolution (2.6 nm) absorption spectrum of the plume from a pure graphite target. The spectrum is dominated by $C_3$ absorption via A $^1\Pi_u \leftarrow X^1\Sigma_g$ and $C_2$ absorption: in the Δv=2, −1, 0, and +1 sequences of the Swan d $^3\Pi_g \leftarrow a^3\Pi_u$ system; and the Δv=0 sequence of the Milliken D $^1\Sigma_u^+ \leftarrow X^1\Sigma_g^+$ system. The dominance of $C_3$ as the principal component of the plume is consistent with mass spectrometric measurements under the same conditions which show that the composition of the plume is primarily $C_3$, $C_2$, and C with very few higher-order clusters (intensity ratio, C:$C_2$:$C_3$$C_4$:$C_5$=56:35:100:2.5:1.6).

Ground-state $C_3$ in the plume was probed by laser induced fluorescence with a 308-nm XeCl laser. FIG. 16(b) shows the LIF spectrum of vaporized graphite in vacuum, displaying predominantly $C_3$ A $^1\Pi_u \rightarrow X$ $^1\Sigma_g$ emission (resolution 10 nm). In addition, weak Δv=0 $C_2$ Swan d $^3\Pi_g \rightarrow a$ $^3\Pi_u$ emission can be observed at 516 nm. The XeCl laser can also excite vibronically-induced absorption of $C_3$ via $^1\Pi_g$ and/or $^1\Delta_u \leftarrow X$ $^1\Sigma_g$.

In addition, the XeCl laser can induce emission from atomic Co (via a $^4F_j \leftarrow y^4G°_j$) and from atomic Ni (via $a^3D_1 \leftarrow y$ $^3D°_2$). It therefore serves as an excellent probe of the ground state atoms and molecules in the plume, both for laser-induced luminescence (LIL) spectroscopy, and spectroscopic imaging of the separate components.

Referring to FIG. 14, both OES and LIL-spectra were acquired at 1000° C. and at room temperature (RT).

FIGS. 17A-17J depict plasma emission (lighter curve) and laser-induced luminescence (black curve) spectra measured at different time delays after the ablation laser pulse, Δt, and distances, x, from the target at 1000° C. during SWNT synthesis: Acquisition times of 100 ns (for Δt<1 ms) and 3.5 μs (or Δt >1 ms) began 0.50 ns after the XeCl-laser pulse. Higher-resolution (1.3-nm) LIL-spectrum in the 320-380 nm region (bottom, right) show the following transitions of atomic Co: (1) b$^4F_{7/2}$-y$^2G°_{9/2}$ at 341.23 nm (2) b$^4F_{9/2}$-y$^4$G$°_{11/12}$ at 345.35 nm (3) b$^4F_{5/2}$-y$^4$G$°_{7/2}$ at 350.98 nm (4) b$^4F_{7/2}$-y$^4$G$°_{9/2}$ at 352.98 nm, and (5) b$^4F_{5/2}$-y$^4$D$°_{5/2}$ at 357.50 nm.

FIGS. 18A-18H depict plasma emission (lighter curve) and laser-induced luminescence (black curve) spectra measured at room temperature at different time delays after the ablation laser pulse, Δt, and distances, x, from the target at (100 ns acquisition times began 35-75 ns after the XeCl-laser pulse).

FIGS. 17a-17J and 18A-18H present a short summary of these spectra, with nascent plasma emission plotted along with the LIL-emission whenever both could be detected. At early times in the plume expansion, close to the target while the plasma is very hot, the plume species are primarily electronically excited and this emission from excited states dominates any laser-induced luminescence (from the ground-states) both at 1000° C. (see FIGS. 17A-17J) and at RT (see FIGS. 18A-18H). Bright nascent emission from $C_2$ (d $^3\Pi_g \rightarrow a$ $^3\Pi_u$, Swan system) and C$^3$ (A$^1\Pi_u \rightarrow X^1\Sigma_g$) dominate at these times. As the plasma expands, cools, and recombines, the ground states become populated, and LIL-emission emerges to compete with the nascent plasma emission. At 1000° C., LIL from atomic Co in the 320-380 nm range (see high-resolution spectrum in FIGS. 17A-17J) is clearly visible. Finally, the nascent plasma emission completely disappears, and only LIL from ground-states remains. From previous measurements of clustering in laser plasmas expanding into background gases, this disappearance of the nascent plasma emission usually signals the onset of nanoparticle formation.

Laser-induced blackbody radiation can be used to signal the presence of carbon clusters, nanoparticles, and nanotubes. The intensity of this blackbody emission, I, is defined by I=Ar$^3$(T$_0$+ΔT)$^5$ where T$_0$ is the initial temperature of the cluster, $\Delta T$ is the temperature increase due to laser heating, A is a constant and r is the cluster radius.

Induced blackbody radiation becomes observable for $\Delta t>200$ μs at 1000 C (FIGS. 17F-17J) and for $\Delta T>50$ μs at room temperature (FIGS. 18D-18H), coincident with the disappearance of the $C_2$ and $C_3$ bands in both the plasma-emission and the laser-induced spectra for $\Delta t>200$ μs at 1000° C. (and $\Delta t>50$ μs at room temperature). From these two coincident measurements, we conclude that the carbon in the plume has substantially converted into clusters or larger aggregates by these times.

However, the atomic Co in the plume remains in atomic form long after the atomic and molecular carbon has disappeared. Integrating the emission in the 320-380 nm range from the LIL-spectra, the ground-state Co population is observed to peak at $\Delta t=0.8$ ms and drop by an order of magnitude by $\Delta t=2$ ms, permitting estimates of the Co clustering time of approximately 2 ms at 1000° C. (approximately 1 ms at room temperature). A similar estimation for the Co clustering time can be performed using spectroscopic imaging of the Co vapor plume (see FIG. 19C).

Blackbody radiation remains the only feature of the spectra taken for $\Delta t>2$ ms at 1000° C. (and images, see FIG. 14D). At room temperature the laser induced blackbody radiation disappears rapidly ($\Delta t$ approximately 5 ms) for the low XeCl-laser intensity employed here [chosen for use at $T_0=1000°$ C. in equation (1)]. The last recognizable feature of the spectrum (see 5 ms image of FIG. 18H) is a broad band at 380 nm, which is currently unidentified.

Hot particulates from the target would be easily imaged via their blackbody emission or by Rayleigh-scattering. It is important to note that we observed very few particulate ejecta for the properly outgassed, hard, Dylon-fabricated targets used in this study.

Spectroscopic Imaging

Once sharp spectral features have been identified throughout a set of spectroscopic data (such as those described above), optical filters can be used in conjunction with ICCD-imaging to selectively image different constituents of the plume. Here, the 320-380 nm spectral region was imaged at 1000° C. to locate the ground-state atomic Co in the plume.

Figure 19A:
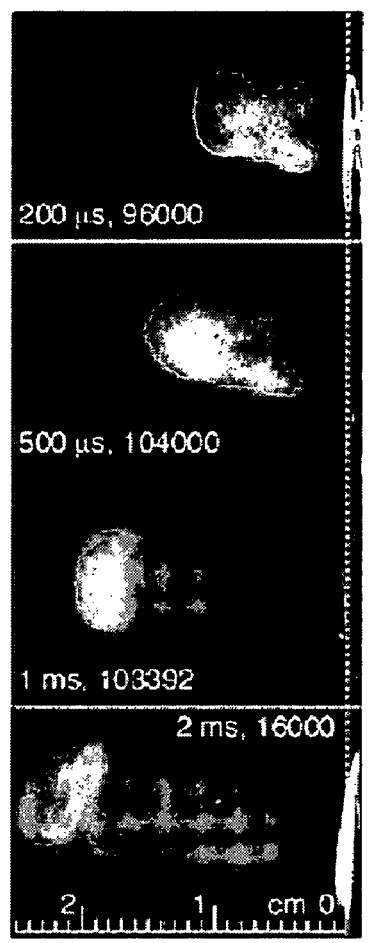
FIGS. 19A-19C illustrate results from a single-walled nanotube synthesis technique, representing an embodiment of the invention.
Figure 19B:
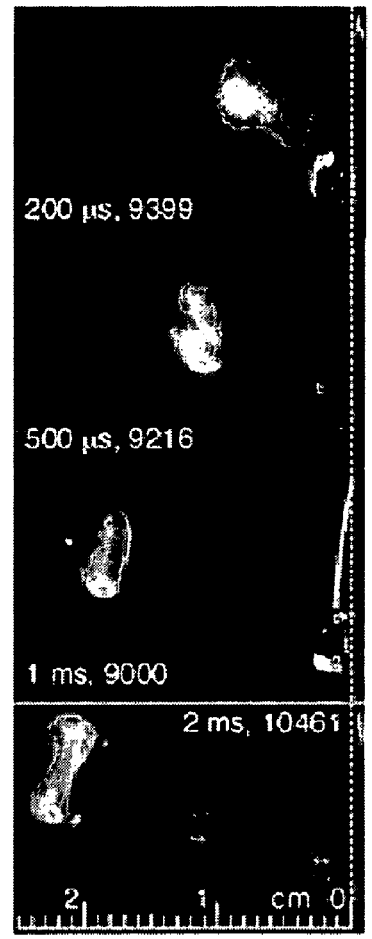
Figure 19C:
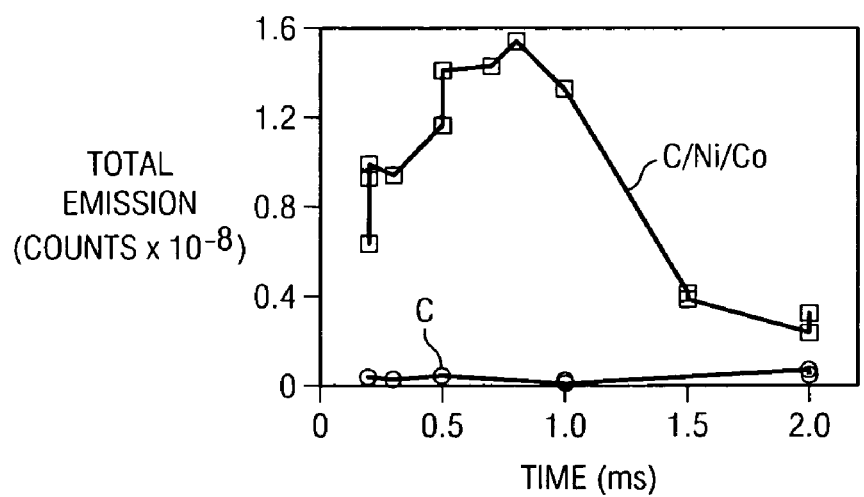

FIGS. 19A-19C depict selective imaging in the 320-380 nm spectral range at high temperature in 500 Torr Ar (100 ns gate width, $\Delta T=0$, peak image intensities listed). FIG. 19A depicts ground-state atomic Co in the plume under conditions or SWNT synthesis using a graphite/Ni/Co target. FIG. 19B depicts carbon species in the same region using a pure pyrolitic graphite target. FIG. 19C depicts total emission intensities from sets of images as shown in FIGS. 19A-19B to compare the ground-state atomic Co temporal history (from C/Ni/Co target) and the background blackbody emission from carbon species (from C target) in the same spectral region.

FIG. 19A-19B show these images along with corresponding images from a pure carbon plume (to assess the extent of blackbody emission from carbon species in the same spectral region). The total integrated luminescence from both sets of images are plotted in FIG. 19C. Again, the ground-state atomic Co population is observed to rise (due to population of the ground states via recombination of the hot plasma) and then decay as these atoms become incorporated in clusters. As in FIG. 14, the carbon in the plume clusters much more quickly and forms a vortex ring.

Further evidence of the sequential condensation of carbon and cobalt into clusters is the relatively uniform spatial distribution of atomic-Co in the plume for $\Delta t<2$ ms compared to the vorticity of the clustered carbon material (compare FIGS. 19A and 19B). We believe that the higher diffusivity of the atomic Co effectively competes with the hydrodynamic trapping within the vortex during this time. Only the leading edge of the atomic-Co plume overlaps the carbon clusters during the condensation of the Co atoms. Assuming that Co clustering initiates nanotube formation, it appears that nanotubes grow from a feedstock of aggregated nanoparticles during seconds of time, confined first within the vortex ring and then by thermophoresis and fluid flow in the quartz tube.

Controlled SWNT Growth With in situ Diagnostics

Figure 20A:
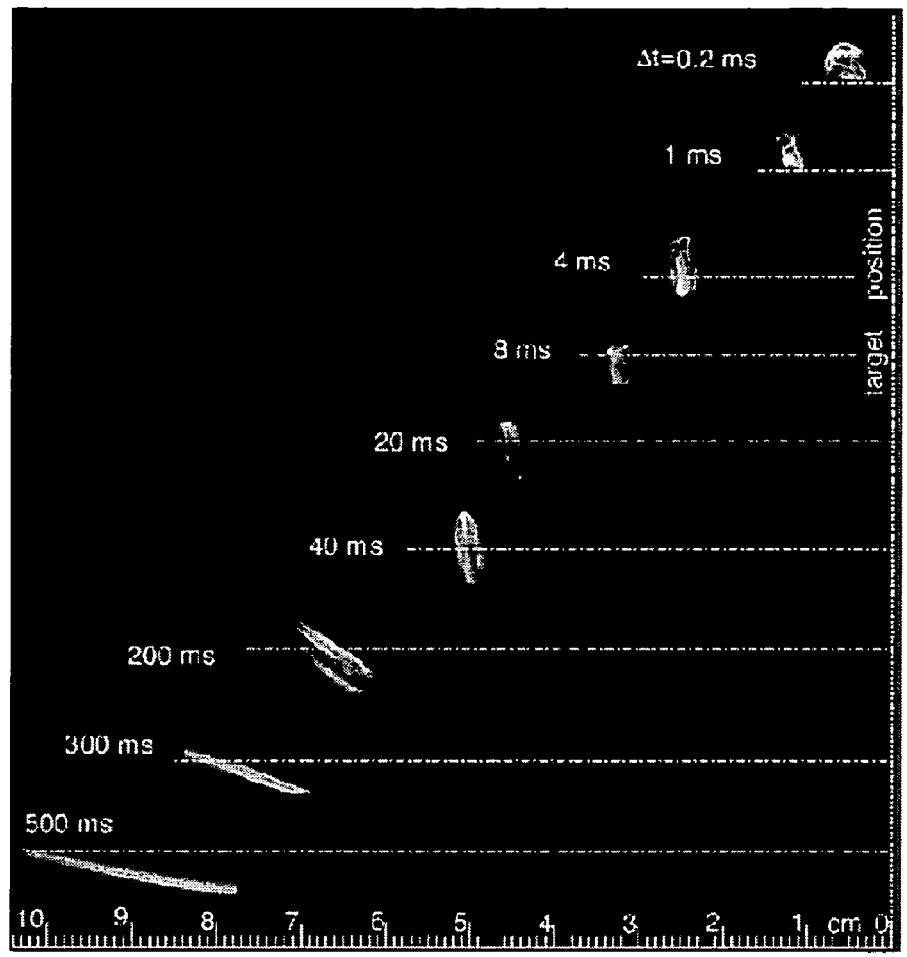
FIGS. 20A-20B illustrate results from a single-walled nanotube synthesis technique, representing an embodiment of the invention.

FIG. 20A depicts laser-induced luminescence (LIL) images of the C/Ni/Co plume during synthesis of SWNT with controlled growth times of approximately 0.5 s. The target is positioned at d=12.5 cm in FIG. 6 FIG. 20B depicts a corresponding deposit collected at point 1 in FIG. 1, showing short (approximately 100 μm) SWNT in the early stages of growth.

In order to check this conclusion and estimate the growth rate, the target was positioned closer to the front furnace edge (d=12.5 cm in FIG. 6) such that the plume spent only approximately 0.5s within the hot zone before exiting the furnace in the upstream direction (as shown in FIG. 20a). From estimates of heat transfer coefficients and the thermal diffusivity of the gas (convection currents were not considered) the thermal gradient near the upstream edge of the furnace was estimated to extend approximately 5 cm into the tube (d>7 cm in FIG. 20A). Thermophoresis is a powerful driving force for gas-suspended nanoparticles, driving them toward cooler regions of the growth chamber (and permitting capture of the nanomaterials on the collector). The intention in this experiment was to utilize the natural plume velocity in the upstream direction (determined from FIG. 14) to drive the plume into the region of the thermal gradient near the upstream edge of the furnace. LIL-ICCD imaging recorded the plume dynamics from ablation to deposition.

The plume motion in FIG. 20A is quite similar to that of FIGS. 14A-14D for $\Delta t<100$ ms. However, for $\Delta t>100$ ms the plume propagation changes dramatically, i.e. the plane of the ring vortex tilts relative to the tube axis and the ring elongates along this axis. Between 0.5-0.7s the plume exits the furnace in this tilted orientation to deposit onto the upper surface of the quartz tube (at point 1 in FIG. 6).

Figure 20B:

A transmission electron microscopy (TEM) image of this deposit is shown in FIG. 20B. The collected material consists of aggregated carbon and metal-catalyst nanoparticles, and think SWNT bundles of only approximately 100 nm length. The relative yield of the carbon particles is larger than the yield of the carbon nanotubes which clearly shows that the time spent by the plume in the hot zone (approximately 0.5s) was not sufficient to convert all of the carbon material into nanotubes. This combined imaging and TEM analysis permits the average growth rate at 1000° C. to be estimated at approximately 0.2 μm/s.

In this example, we have used laser-induced imaging and spectroscopy diagnostic techniques, along with ex situ TEM, to determine that single-walled carbon nanotubes form over several seconds inside the hot furnace after laser vaporization. Size-controlled SWNT were formed in short 100-nm lengths by controlling the growth time with these diagnostics to approximately 0.5s, yielding 0.2 μm/s for the first estimate of the SWNT growth rate by LV. The spectroscopy at early times after laser ablation indicates that the plume initially consists of atomic and molecular species, with no evidence of hot molten particulates which were recently suggested as the primary ejecta. Condensation of carbon occurs within 0.2 ms after ablation, while atomic Co condenses much later (between 1.5 and 2 ms) at 1000° C. The nanotubes grow within a vortex ring which rap clusters and aggregates within a approximately 1 cm$^3$ volume during very long periods of time (approximately 3 s). Assuming that metal catalyst clusters are required before carbon nanotube growth begins, we conclude that feedstock for nanotube growth in this mixture of carbon and metal catalyst nanoparticles. It is quite possible that the carbon clusters serve as the condensation centers for the metal clusters, and mixed carbon-catalyst alloy clusters are produced. Finally, we produced high-purity SWNT deposits with laser repetition rates as low as 0.016 Hz. Though these images of the growth process, we conclude that long (approximately 10 μm) SWNT can form from the small amount of material vaporized in a single-laser shot, a remarkable feat of self-assembly.

Practical Applications of the Invention

A practical application of the invention that has value within the technological arts are automotive manufacturers, aerospace vehicles, nanotube engines, ballistics, hydrogen storage batteries and airplane components. There are virtually innumerable uses for the invention, all of which need not be detailed here.

Advantages of the Invention

A composition or method, representing an embodiment of the invention, can be cost effective and advantageous for at least the following reasons. The invention includes production processes that will allow (1) formation rates of nanostructures necessary for reasonable production rates, (2) the near net shaped production of component structures.

All the disclosed embodiments of the invention described herein can be realized and practiced without undue experimentation. Although the best mode of carrying out the invention contemplated by the inventors is disclosed above, practice of the invention is not limited thereto. Accordingly, it will be appreciated by those skilled in the art that the invention may be practiced otherwise than as specifically described herein.

For example, the individual components need not be formed in the disclosed shapes, or assembled in the disclosed configuration, but could be provided in virtually any shape, and assembled in virtually any configuration. Further, the individual components need not be fabricated from the disclosed materials, but could be fabricated from virtually any suitable materials. Further, although the nanotubes described herein can be physically separate modules, it will be manifest that the nanotubes may be integrated with associated devices and/or apparatus. Furthermore, the invention is useful for converting and growing noncrystalline materials such as, for example, glass and polymers. Further still, all the disclosed elements and features of each disclosed embodiment can be combined with, or substituted for, the disclosed elements and features of every other disclosed embodiment except where such elements or features are mutually exclusive.

It will be manifest that various additions, modifications and rearrangements of the features of the invention may be made without deviating from the spirit and scope of the underlying inventive concept. It is intended that the scope of the invention as defined by the appended claims and their equivalents cover all such additions, modifications, and rearrangements.

The appended claims are not to be interpreted as including means-plus-function limitations, unless such a limitation is explicitly recited in a given claim using the phrase "means for." Expedient embodiments of the invention are differentiated by the appended subclaims.

What is claimed is:

1. A method, comprising:
depositing a condensed phase matrix material comprising a plurality of particles;
activating said condensed phase matrix material after the depositing, the condensed phase matrix material not being vaporized during the activating thereof; and
forming a plurality of nanorods by condensed phase conversion and growth from the condensed phase matrix material instead of from vapor.

2. The method of claim 1, further comprising, prior to depositing the condensed phase matrix material, condensing a gaseous phase source of the condensed phase matrix material to form the plurality of particles.

3. The method of claim 1, wherein said condensed phase matrix material includes at least one member selected from the group consisting of carbon, silicon, silicon carbide, germanium, and gallium arsenide and said plurality of nanorods include at least one member selected from the group consisting of carbon, silicon, silicon carbide, germanium, boron nitride and gallium arsenide.

4. The method of claim 3, wherein said condensed phase matrix material includes amorphous carbon particles with an average diameter of from approximately 1 nm to approximately 100 nm.

5. The method of claim 1, further comprising providing a plurality of catalyst particles, wherein activating said condensed phase matrix material includes activating said plurality of catalyst particles to produce a plurality of nanorods by condensed phase conversion and growth.

6. The method of claim 1, wherein said condensed phase matrix material is prepared by at least one technique selected from the group consisting of laser ablation, thermal spray, electric arc, plasma arc, infrared vaporization, microwave vaporization, mechanical grinding, mechanical fracture, explosive vaporization, ion sputtering, electron beam etching.

7. The method of claim 1, wherein said condensed phase matrix material includes a plurality of solid phase templates produced by condensed phase conversion and growth, and activating said condensed phase matrix material includes reactivating said plurality of solid phase templates to grow said plurality of nanorods by condensed phase conversion and growth from said solid phase templates.

8. The method of claim 7, wherein said plurality of solid phase templates include nanorods.

9. The method of claim 7, wherein said plurality of solid phase templates include single wall nanotubes.

10. The method of claim 1, wherein said condensed phase matrix material is provided in a pattern on a substrate.

11. The method of claim 10, further comprising providing at least one catalyst particle on said pattern, wherein activating said condensed phase matrix material includes activating said at least one catalyst particle to transform said condensed phase matrix material into at least one nanorod by condensed phase conversion and growth.

12. The method of claim 1, wherein said condensed phase matrix material is provided in a mold space.

13. The method of claim 1, wherein said plurality of nanorods include at least one substantially cylindrical nanostructure selected from the group consisting of nanowires, multi-wall nanotubes and single-wall nanotubes.

14. The method of claim 1, wherein said plurality of nanorods are interrelated to define a substantially random distribution of intersection angles between the plurality of nanorods.

15. The method of claim 1, wherein said plurality of nanorods are interwoven.

16. The method of claim 1, wherein condensed phase conversion and growth includes solid-state conversion and growth.

17. The method of claim 1, wherein activating takes place after depositing.

18. The method of claim 1, further comprising placing said plurality of nanorods in contact with a condensed phase feedstock material and annealing to continue growth of the plurality of nanorods.

19. A method for producing nanorods, the method comprising:
   forming a mixture of particles, the mixture comprising metal catalyst particles in contact with particles of a condensed phase matrix material;
   heating the mixture of particles on a substrate to a temperature insufficient to vaporize the condensed phase matrix material; and
   forming a plurality of nanorods on the substrate by condensed phase conversion and growth from the particles of the condensed phase matrix material.

20. The method of claim 19, further comprising delivering at least one of the condensed phase matrix material and the metal catalyst particles to the substrate.

21. The method of claim 20, wherein the delivering comprises co-depositing the condensed phase matrix material and the metal catalyst particles on the substrate.

22. The method of claim 20, wherein the delivering comprises depositing the condensed phase matrix material on the substrate and subsequently depositing the metal catalyst particles on the substrate.

23. The method of claim 20, wherein the delivering occurs after forming the mixture of particles.

24. The method of claim 20, wherein the delivering occurs prior to forming the mixture of particles.

25. The method of claim 19, further comprising, prior to forming the mixture, condensing from a vapor at least one of (a) the particles of the condensed phase matrix material and (b) the metal catalyst particles.

26. The method of claim 25, further comprising, after the condensing, aggregating at least one of (a) the particles of the condensed phase matrix material and (b) the metal catalyst particles.

27. The method of claim 19, wherein the heating comprises sintering the condensed phase matrix material.

28. The method of claim 19, wherein the temperature is in excess of 1000° C.

29. The method of claim 19, wherein the plurality of nanorods grow at a rate of about 0.2 μm/s.

30. The method of claim 19, wherein the mixture of particles includes solid phase particles.

31. The method of claim 19, wherein the mixture of particles includes liquid phase particles.

32. The method of claim 19, wherein the mixture of particles comprises sub-100 nm particles.

33. The method of claim 19, wherein the nanorods comprise a non-carbon material.

34. The method of claim 19, wherein the nanorods comprise carbon.

35. The method of claim 19, wherein the nanorods include at least one substantially cylindrical nanostructure selected from the group consisting of nanowires, multi-wall nanotubes and single-wall nanotubes.

36. The method of claim 19, wherein the metal catalyst particles comprise at least one element selected from the group consisting of Fe, Ni, Co, Rh, and Pd.

37. The method of claim 33, wherein the nanorods consist essentially of the non-carbon material.

38. The method of claim 19, wherein the nanorods formed on the substrate are epitaxial nanorods.

39. The method of claim 19, wherein the nanorods formed on the substrate are at least partially interwoven nanorods.

40. The method of claim 19, wherein the temperature to which the mixture is heated is a first temperature $T_1$ greater than or equal to $T_{activation}$ at which growth of the nanorods begins, and
   further comprising, after heating the mixture to the first temperature $T_1$, heating the mixture to a second temperature $T_2$ lower than the first temperature $T_1$ to maintain growth of the nanorods.

* * * * *